US009256974B1

(12) United States Patent
Hines

(10) Patent No.: US 9,256,974 B1
(45) Date of Patent: Feb. 9, 2016

(54) 3-D MOTION-PARALLAX PORTABLE DISPLAY SOFTWARE APPLICATION

(71) Applicant: Stephen P Hines, Glendale, CA (US)

(72) Inventor: Stephen P Hines, Glendale, CA (US)

( * ) Notice: Subject to any disclaimer, the term of this patent is extended or adjusted under 35 U.S.C. 154(b) by 189 days.

(21) Appl. No.: 13/797,777

(22) Filed: Mar. 12, 2013

Related U.S. Application Data

(63) Continuation-in-part of application No. 13/797,379, filed on Mar. 12, 2013, which is a continuation-in-part of application No. 13/100,193, filed on May 3, 2011, now abandoned.

(60) Provisional application No. 61/331,328, filed on May 4, 2010, provisional application No. 61/362,524, filed on Jul. 8, 2010, provisional application No. 61/427,037, filed on Dec. 23, 2010.

(51) Int. Cl.
*G06T 15/00* (2011.01)
*G06F 3/0346* (2013.01)
*G06F 1/16* (2006.01)

(52) U.S. Cl.
CPC .............. *G06T 15/00* (2013.01); *G06F 1/1626* (2013.01); *G06F 3/0346* (2013.01); *G06F 2200/1637* (2013.01)

(58) Field of Classification Search
CPC ... G06F 1/1626; G06F 1/1684; G06F 1/1694; G06F 3/0346; G06F 3/04815; G06F 2200/1637

USPC .......... 345/419, 620, 621; 382/281; 358/1.18, 358/488
See application file for complete search history.

(56) References Cited

U.S. PATENT DOCUMENTS

| | | | |
|---|---|---|---|
| 6,710,774 B1* | 3/2004 | Kawasaki et al. ............. | 345/419 |
| 6,791,723 B1* | 9/2004 | Vallmajo et al. ............. | 358/488 |
| 6,954,284 B2* | 10/2005 | Enomoto ..................... | 358/1.18 |
| 7,034,848 B2* | 4/2006 | Sobol .......................... | 345/620 |
| 7,663,648 B1* | 2/2010 | Saldanha et al. ............. | 345/630 |
| 7,920,758 B2* | 4/2011 | Ferguson ..................... | 382/281 |
| RE42,881 E * | 11/2011 | Vallmajo et al. ............. | 358/488 |
| 2006/0132675 A1* | 6/2006 | Choi ............................ | 349/76 |

* cited by examiner

*Primary Examiner* — Phu K Nguyen
(74) *Attorney, Agent, or Firm* — Roy L Anderson

(57) ABSTRACT

A video recording that includes rotation around a central point within a desired range of motion is used to generate a set of frames that is cropped by use of a centering reference and a cropping template registered to each frame by using the centering reference in each of the frames. The centering reference is an interocular distance of the photographic subject (which may be a live person or a mannequin) so that a vertical centerline established at a midpoint of the interocular distance is centered laterally by the cropping template. The images obtained can be displayed in a portable computer device to give an illusion of viewing a photographic subject as a solid 3-D object on the screen and additional product images can be merged to give the further illusion that the subject is wearing the product.

15 Claims, 35 Drawing Sheets

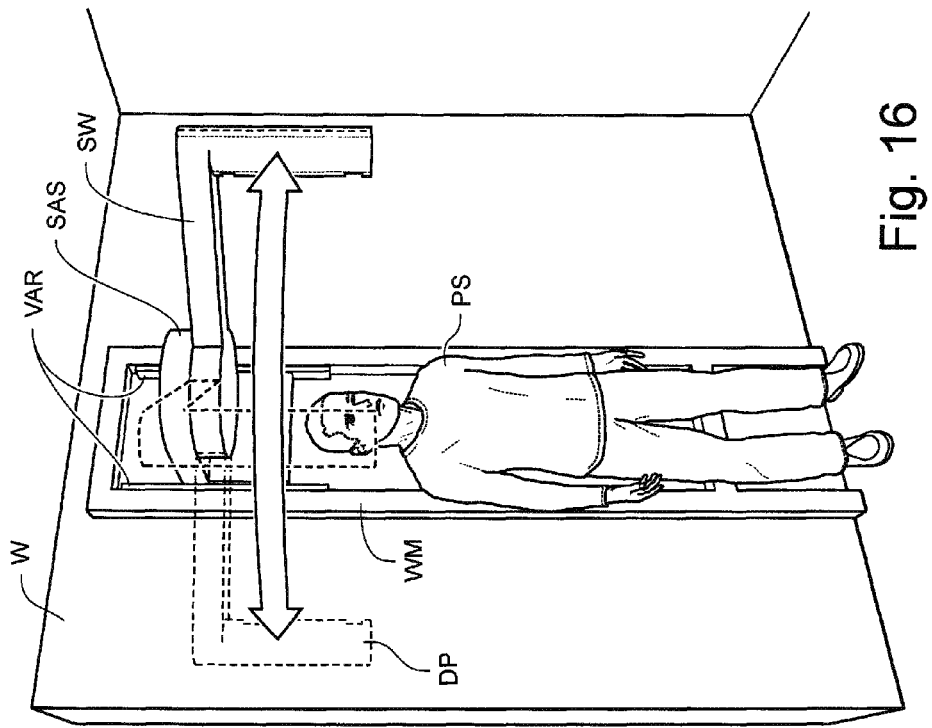
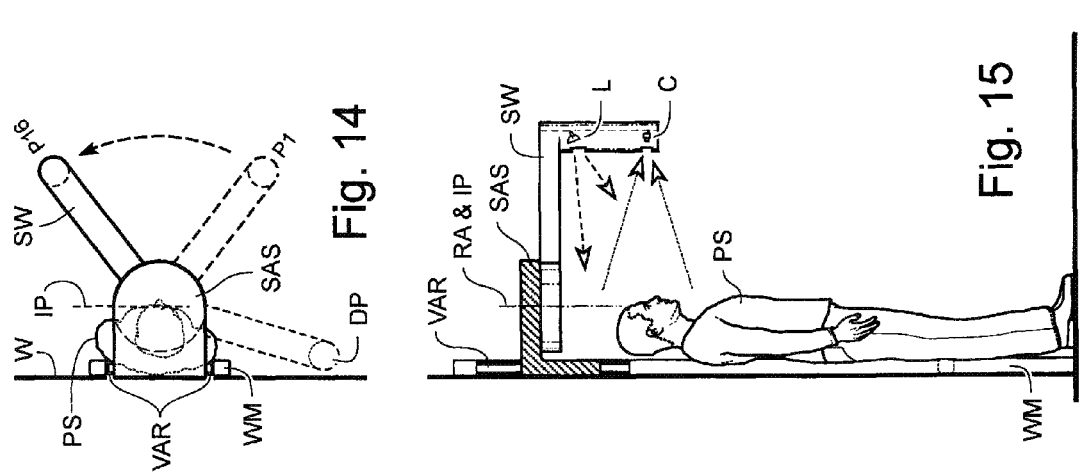

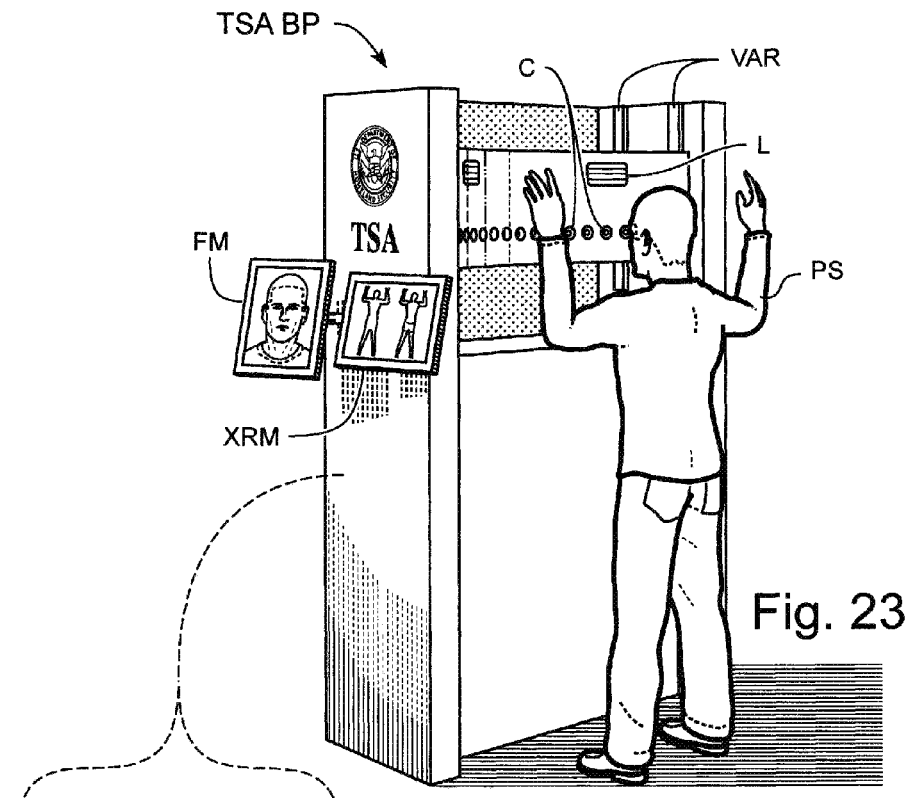
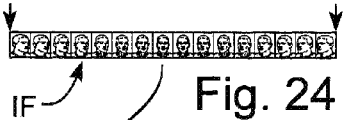
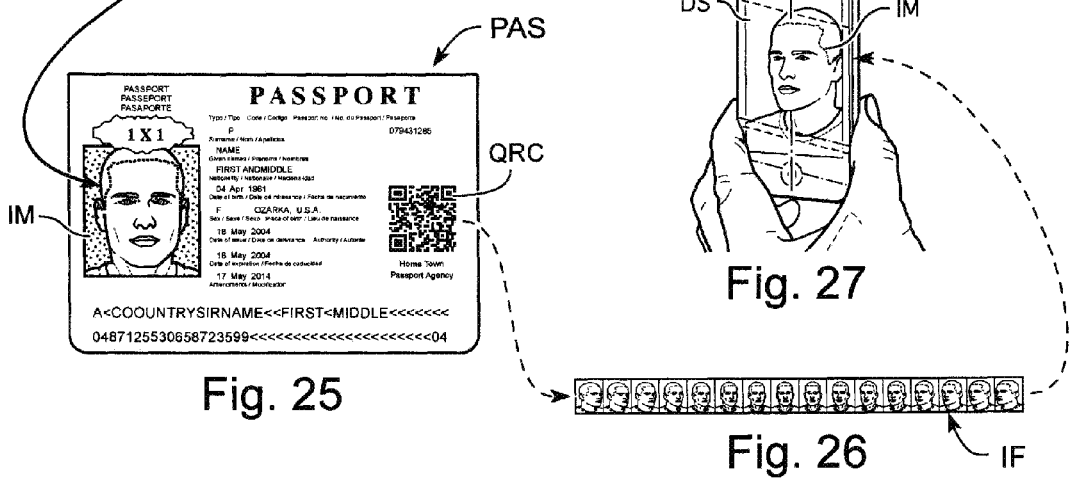

| frame number | a off-axis angle of screen | horizontal expansion ratio to look normal = 1 / cos a |
|---|---|---|
| 8 & 9 | 2.5° | 1.001 |
| 7 & 10 | 7.5° | 1.008 |
| 6 & 11 | 12.5° | 1.024 |
| 5 & 12 | 17.5° | 1.048 |
| 4 & 13 | 22.5° | 1.082 |
| 3 & 14 | 27.5° | 1.127 |
| 2 & 15 | 32.5° | 1.186 |
| 1 & 16 | 37.5° | 1.260 |

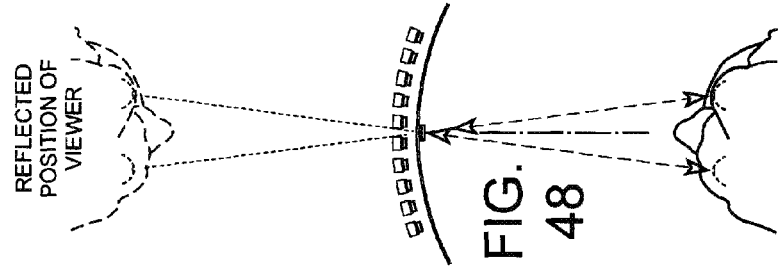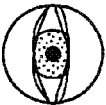
FIG. 47
RIGHT EYE SEES LEFT EYE REFLECTED IN MIRROR
FIG. 47A
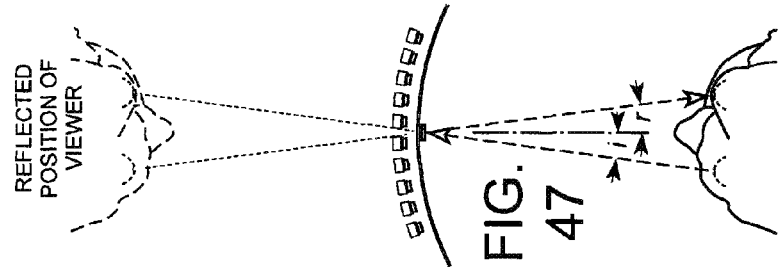
FIG. 48
BOTH EYES SEE THE OPPOSITE EYE REFLECTED IN MIRROR
FIG. 48A
FIG. 46B
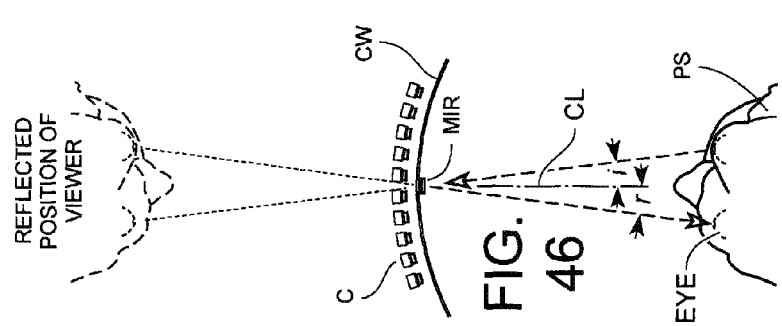
FIG. 46
LEFT EYE SEES RIGHT EYE REFLECTED IN MIRROR
FIG. 46A

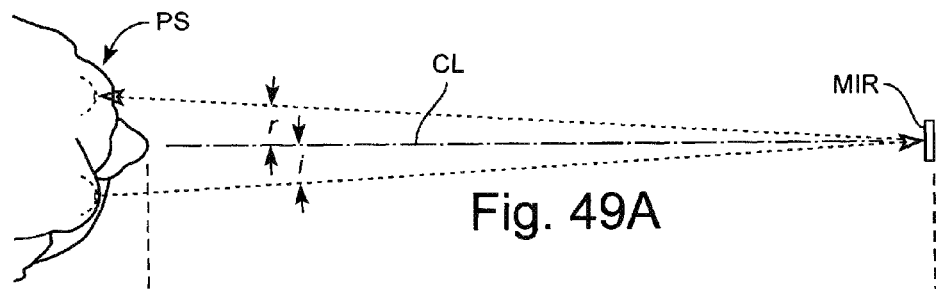
Fig. 49A
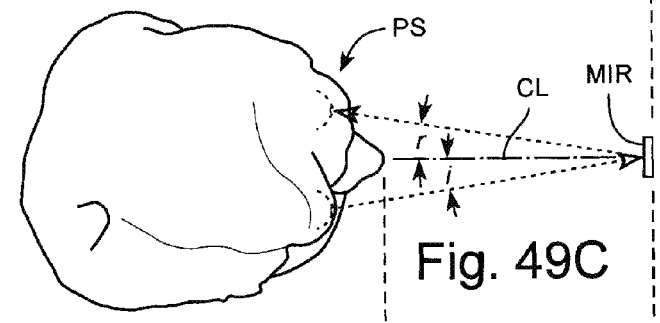
Fig. 49C
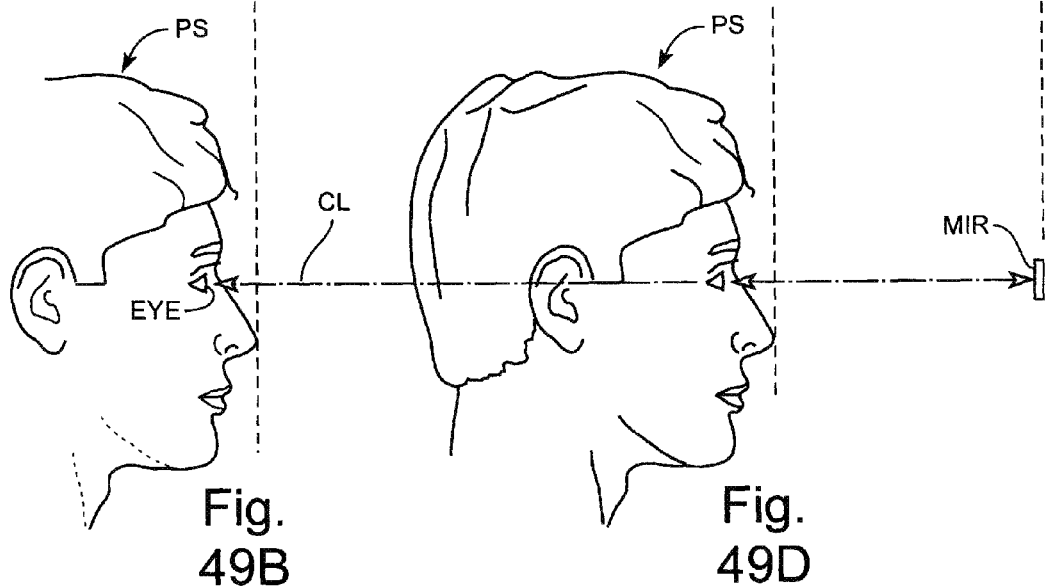
Fig. 49B
Fig. 49D

LEFT EYE SEES THE RIGHT
EYE REFLECTED IN MIRROR

RIGHT EYE SEE THE LEFT
EYE REFLECTED IN MIRROR

BOTH EYES SEE THE OPPOSITE
EYE REFLECTED IN MIRROR

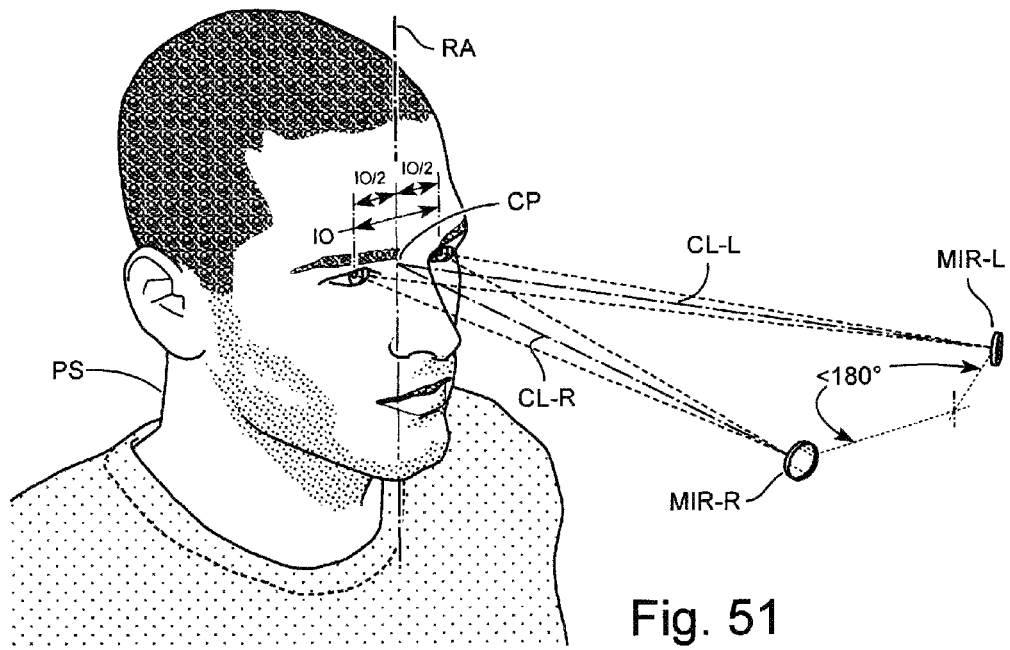
Fig. 51
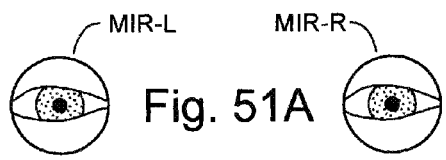
LEFT EYE SEES RIGHT EYE
REFLECTED IN BOTH MIRRORS
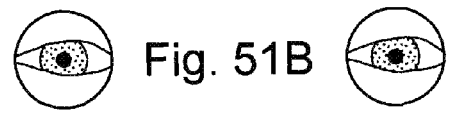
RIGHT EYE SEES LEFT EYE
REFLECTED IN BOTH MIRRORS
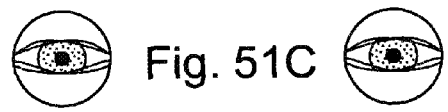
BOTH EYES SEE OPPOSITE EYE
REFLECTED IN BOTH MIRRORS

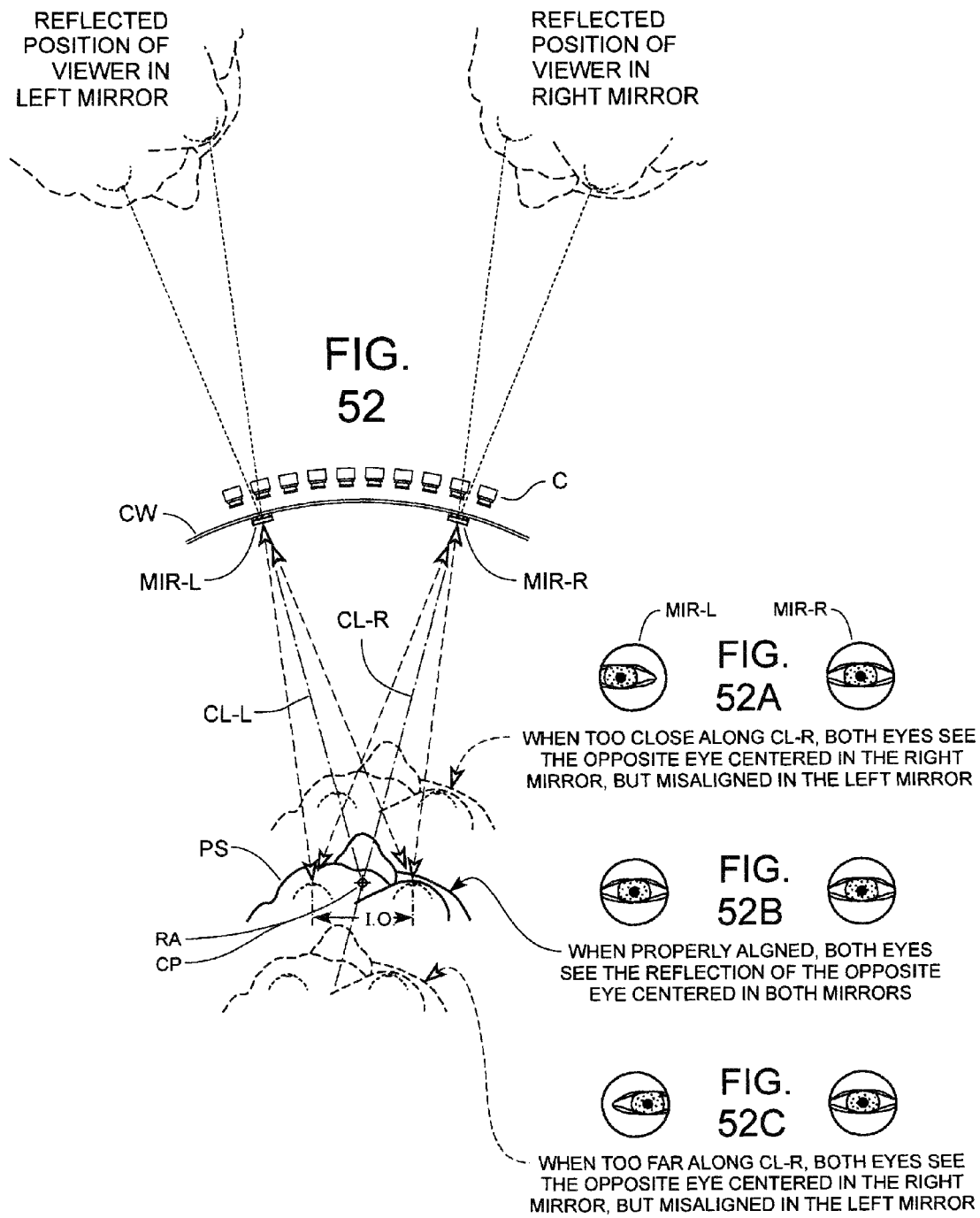

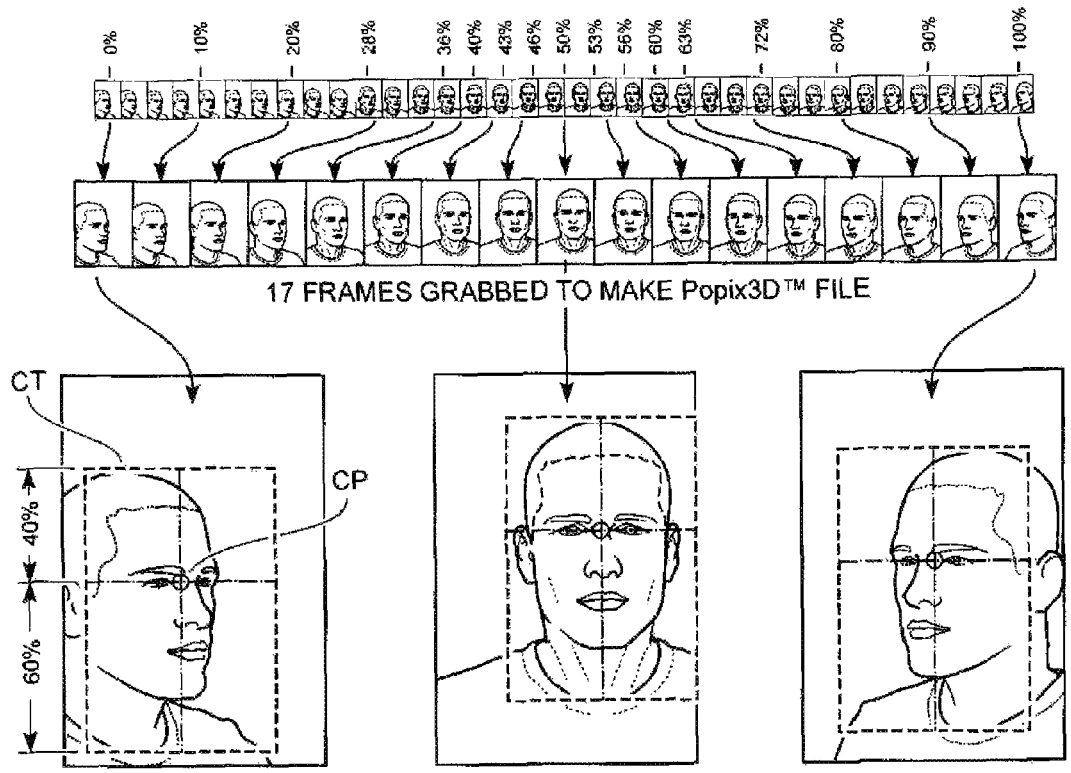

FIG. 53, ORIGINAL VIDEO OF UNKNOWN LENGTH

17 FRAMES GRABBED TO MAKE Popix3D™ FILE

FIG. 53A, EXAMPLE: FIRST FRAME USES THE SAME SIZE CROPPING TEMPLATE AS IN FIG. 53B

FIG. 53B, WORSE-CASE VIDEO FRAME WHERE THE TEMPLATE, CENTERED ON THE EYES, TOUCHES A FRAME EDGE

FIG. 53C, EXAMPLE: LAST FRAME USES THE SAME SIZE CROPPING TEMPLATE AS IN FIG. 53B

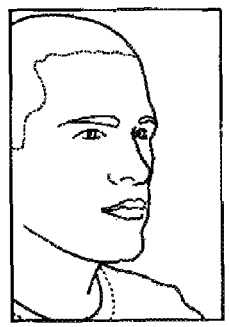
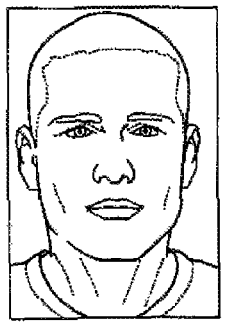
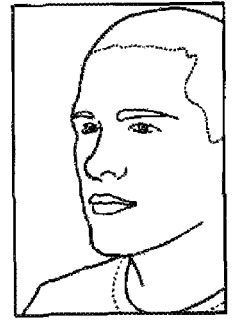

FIG. 53D, EDITED FIRST FRAME, EYES CENTERED LATERALLY

FIG. 53E, EDITED WORSE-CASE FRAME, EYES CENTERED LATERALLY

FIG. 53F, EDITED LAST FRAME, EYES CENTERED LATERALLY

| proportional position in video | Popix3D™ app video frame # | lenticular 3-D print frame # |
|---|---|---|
| 0/60 = first | 01 | -- |
| 6/60 = 10% | 02 | -- |
| 12/60 = 20% | 03 | -- |
| 17/60 = 28% | 04 | 08 |
| 22/60 = 36% | 05 | 07 |
| 24/60 = 40% | 06 | -- |
| 26/60 = 43% | 07 | 06 |
| 28/60 = 46% | 08 | -- |
| 30/60 = 50% | 09 | 05 |
| 32/60 = 53% | 10 | -- |
| 34/60 = 56% | 11 | 04 |
| 36/60 = 60% | 12 | -- |
| 38/60 = 63% | 13 | 03 |
| 43/60 = 72% | 14 | 02 |
| 48/60 = 80% | 15 | 01 |
| 54/60 = 90% | 16 | -- |
| 60/60 = last | 17 | -- |

# 3-D MOTION-PARALLAX PORTABLE DISPLAY SOFTWARE APPLICATION

CROSS REFERENCE TO RELATED APPLICATIONS

The present application is a continuation-in-part application of prior U.S. Ser. No. 13/100,193, filed May 3, 2011, which claimed priority from provisional patent applications 61/331,328, filed May 4, 2010, 61/362,524, filed Jul. 8, 2010, and 61/427,037, filed Dec. 23, 2010, the disclosures of all of which are specifically incorporated herein by reference. The present application is also a continuation-in-part application of U.S. Ser. No. 13/797,379, filed Mar. 12, 2013.

FIELD OF THE INVENTION

The present invention is in the field of display applications for portable electronic devices, and more particularly to a system that uses software applications to create and display an image file that will give the illusion of a three-dimensional (3-D) photographic subject.

BACKGROUND OF THE INVENTION

The seven known depth cues, in descending order of effectiveness, are:

1. Stereopsis (the perception of depth in images from two laterally-displaced lenses).
2. Motion parallax (relative shift of objects due to viewer or subject motion).
3. Perspective (lines in a scene receding toward a vanishing point).
4. Occlusion (one object blocking another).
5. Relative object size.
6. Atmospheric haze.
7. Accommodation (focus).

The term "3D" is used liberally and is frequently used incorrectly when describing images on a flat 2-dimensional screen when the only depth cues may be perspective, occlusion, relative size or atmospheric haze. A true 3-dimensional image conveys a sense of depth using stereopsis or motion parallax and provides a measure of look-around ability.

Electronic-image displays are used on many products, including televisions, computer monitors, electronic-book (e-book) readers, and cell phones, and which produce flat 2-dimensional images.

SUMMARY OF THE INVENTION

The present invention is generally directed to a method in which a video recording is obtained of a photographic subject that includes rotation around a central point within a desired range of motion, a set of frames is selected from the video recording within a preselected range of camera angles within the desired range of motion, and then each frame is cropped and stored in a computer-readable medium. Each frame is cropped by using a centering reference and a cropping template registered to each frame by using the centering reference in each of the frames.

The centering reference used in cropping is an interocular distance of the photographic subject (which may be a live person or a mannequin) so that a vertical centerline established at a midpoint of the interocular distance is centered laterally by the cropping template.

The images obtained can be displayed in a portable computer device by using a sensor to measure rotation around a point of the device's screen and than displaying multiple images on the screen in response to input from the sensor so that the displayed image on the screen moves in correspondence with the screen to give an illusion of viewing a photographic subject as a solid 3-D object on the screen. The photographic subject in each frame of the set of cropped frames is aligned in a vertical position, a lateral position and a longitudinal position at a preselected image plane and the vertical centerline of each of the multiple images from the computer-readable medium is displayed at the center of the screen.

The cropping template can crop each frame to a desired ratio and resize the image. The cropping template is sized by choosing substantially the Largest size possible without going outside an original video area for arty of the frames it is cropping.

A set of product images of a product can be merged with a set of cropped images to create a set of merged images so that in a display of the merged images the product is centered laterally and the product is registered with the photographic image to give an illusion that each of the images in the set of merged images is an actual image of the photographic subject wearing the product. The product images can be taken of the product on a mannequin (or its head) and the product in each product image is aligned by the product vertical centerline established at the midpoint of the interocular distance of the mannequin. The product and photographic images are registered by aligning their vertical centerlines.

Accordingly, it is a primary object of the present invention to provide a method for obtaining photographs for use is a 3-D display from a video recording and also to allow such photographs to be merged with products to give a lifelike 3-D display appearance.

This and further objects and advantages will be apparent to those skilled in the art in connection with the drawings and the detailed description of the invention set forth below.

BRIEF DESCRIPTION OF THE DRAWINGS

FIG. 7 illustrates a multi-camera system for taking pictures useful in the present invention in which each of 16 cameras are placed at a fixed angle while

FIGS. 14-16 illustrate a photographic technique useful in the present invention in which a camera is mounted on a swing-arm assembly that can move about a stationary photographic subject. FIG. 14 is a top view, FIG. 15 is a side view and FIG. 16 is a front perspective view.

FIG. 18 illustrates moving a camera about a fixed point (similar in concept to FIGS. 14-16) while FIG. 19 illustrates keeping the camera at a fixed point and moving the photographic subject (similar in concept to FIG. 17).

FIG. 20 illustrates obtaining a MRI data file while

FIGS. 23-27 and 28-32 illustrate uses of the present invention in which a photographic subject is photographed in front of a camera assembly (FIGS. 23, 28), an image file (FIGS. 24, 29) is created, one image from the image file is used in either a passport (FIG. 25) or a drivers license (FIG. 30) along with a quick response code and then the image file (FIGS. 26, 31) can be accessed and displayed on a personal computing device (FIGS. 27, 32) by referencing the quick response code.

FIGS. 34a-34h, illustrate the steps used in a preferred embodiment of the present invention for formatting photographs taken in a photo booth such as shown in FIG. 10 while

FIGS. 46-48 illustrate alignment of a photographic subject along center line CL using a single mirror (shown in FIG. 46B) while FIGS. 46A, 47A and 48A illustrate what one or both eyes see reflected in the mirror shown in FIGS. 46, 47 and 48. FIGS. 49A-D illustrate how a single mirror allows the photographic subject to be properly aligned vertically and laterally; however, this technique provides no help in longitudinal alignment, because the reflections of the eyes as shown in FIGS. 50A-C are identical at any distance from the mirror. FIGS. 51 and 51A-C illustrate the use of two mirrors to properly align the photographic subject vertically, laterally and longitudinally while FIGS. 52, 52A and 52C illustrate the effect of longitudinal misalignment.

FIGS. 53 and 53A-F illustrate the process of creating an image file according to the present invention from use of a video clip. In accordance with this process, FIG. 55 shows the relative angular position in the 60 degree angular sweep shown in FIG. 54 while FIG. 56 illustrates the images contained in the image file and how they can be reduced to generate a lenticular 3-D print.

FIGS. 57-59 illustrate how an image file can be created of inanimate objects, while

DETAILED DESCRIPTION OF THE INVENTION

The present application discloses a methodology implementable in a portable computing device that gives the illusion of a 3-D photographic subject. The 3-D technique used in this methodology does not provide stereoscopic imagery; however, it provides a strong illusion of depth using the second-most effective depth cue, motion parallax, which heretofore has been unavailable on display screens of portable computing devices. The methodology requires use of a portable computing device having one or more sensors to detect rotational movement (preferably pitch and yaw motion using, e.g., accelerometers, compass or gyros which are presently available in some cell phones and e-book readers) and with the ability to receive or download image files.

The methodology disclosed herein uses what will be referred to hereinafter as a multi-image file. The file is created by combining photographs of photographic subjects. The pictures can be taken by a single camera or by multiple cameras. A number of, different embodiments of devices for taking such pictures are discussed in detail later on, including how such devices can be used for various specialty applications. Alternatively, the multi-image file can also be created by using computer generated models and rendering, which is also discussed in detail later on.

The multi-image file is created photographically or by one or more software applications, or apps, and then transferred to a portable computing device and then displayed on a screen through use of one or more additional software applications to let people see the three-dimensional shape of objects contained in the multi-image file without the need for 3-D glasses. When the portable computer system is turned about one or more axes of the image center of its screen the corresponding view of the photographic subject is displayed using motion parallax as if the subject were a three-dimensional physical object. For reasons which will be explained later, in an especially preferred embodiment, each image file contains 16 (Roy, I switched to 17 images about a year ago, but this patent application refers to both) images which are displayed one at a time, linked to the motion sensor in the device.

In the Figures and the following description, letter designations indicate various features of the invention, with like letter designations referring to like features throughout both the drawings and the description. Although the Figures are described in greater detail below, the following is a glossary of the elements identified in the Figures.

Figure 1:
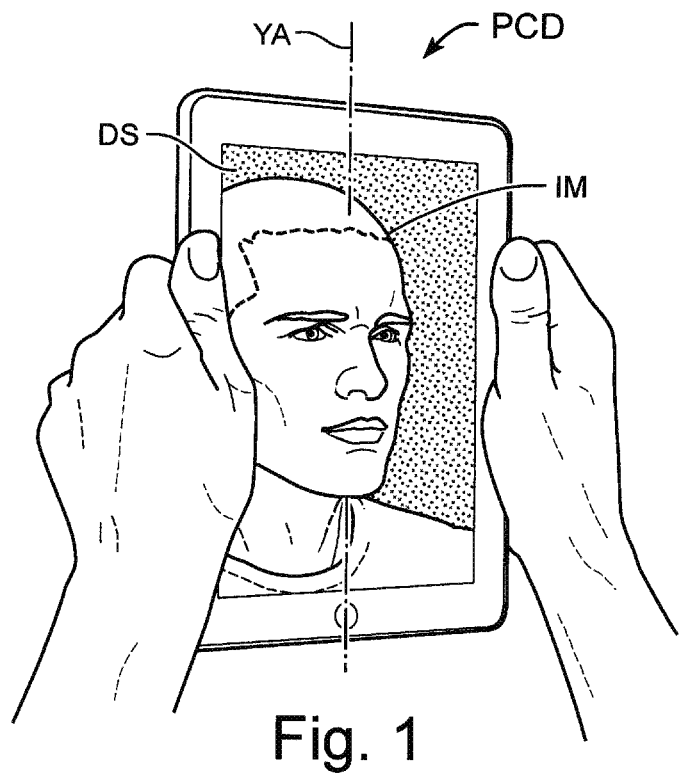
FIGS. 1 and 2 illustrate how an image shown on a screen of a portable computing device changes with a change in motion of the screen in accordance with the present invention.
Figure 2:
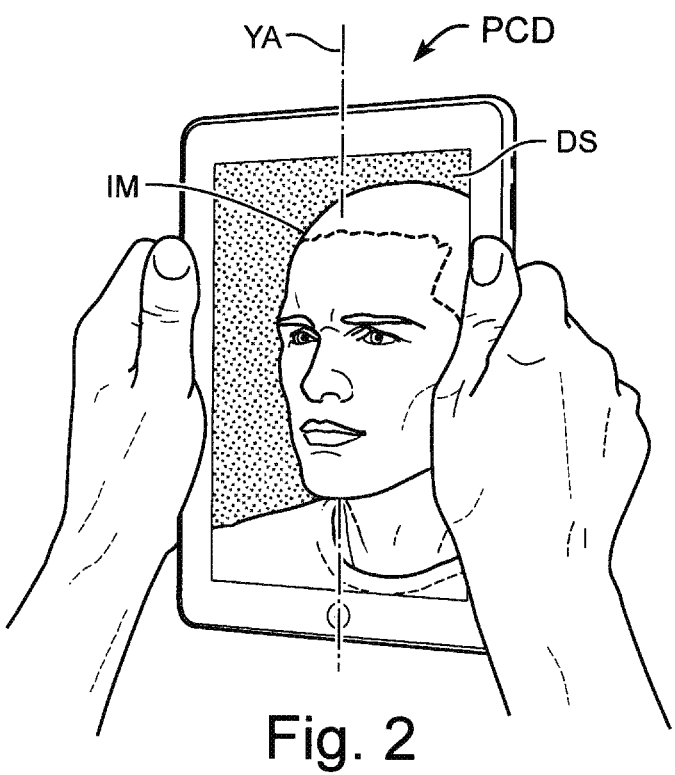
Figure 3:
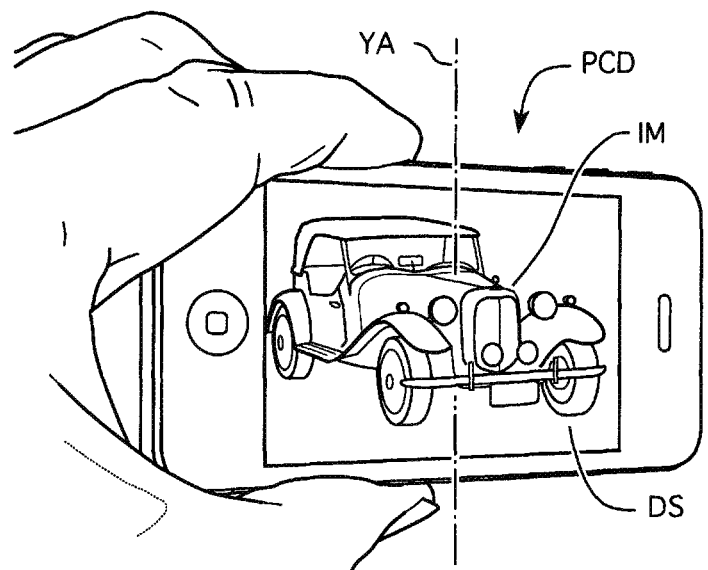
FIGS. 3 and 4 illustrate the same concept, except whereas the screen is in a vertical orientation in FIGS. 1 and 2, it is in a horizontal orientation in FIGS. 3 and 4.
Figure 4:
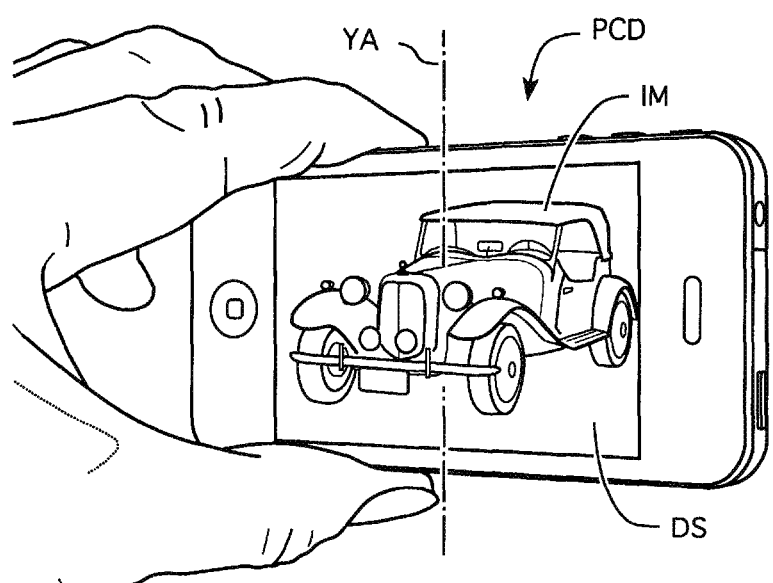

Glossary:
a off-axis Angle
AD Alignment Drawing
AF Alignment Film
AI Angle Indicators
AM Alignment Monitors
ADSW Apparent Display Screen Width
B Bassinet
BC Baby Camera
BS Beam Splitter
C Camera CA Camera Assembly
CB Checkerboard
CI Camera Image
CL Center Line
CL-L Center Line-Left
CL-R Center Line-Right
CT Cropping Template
CUR Curtain
CCS Credit-Card Swiper
CW Cured Window
DL Driver's License
DMVC Department of Motor Vehicles Camera
DP Docking Position of swing arm
DS Display Screen
DVR Digital Video Recorder
EYE Eye
FCM Flexure Camera Mount
FH Flexure Hinge
FD Face Drawing
FD-R Face Drawing Reflection
FM Face Mirror
GS Green Screen
HB Hole in Beamsplitter
HM Hole in face Mirror
i Incident Angle
IC Image Center
IF Image File
IM Image
Interocular Distance
IO/2 Interocular Distance divided by 2
IP Image Plane
L Light
LP Lenticular Picture
M Mannequin
MAC Computer
MH Mounting Hole
MIR Mirror
MIR-L Mirror-Left
MIR-R Mirror-Right
MRI MRI (Magnetic Resonance Imaging) machine
MS Mounting Screw
P Pointer
P1 Position #1 of swing arm
P16 Position #16 of swing arm
PA lateral Pitch Axis
PAH Pitch-Adjustment Holes
PAS Passport
PASC Pitch-Adjustment Screw
PB Photo Booth
PCD Portable Computing Device
PR Product
PS Photographic Subject
PS-I Photographic Subject Illusion
PS-R Photographic Subject Reflection
PUP Pupil
QRC QR Code (Quick Response Code)
r Reflected Angle
RA Rotational Axis
S Sensor
SAS Swing Arm Support
SP Securing Plate
ST Stool
SW Swing Arm
T Turntable
TSA PB TSA Photo Booth
VAR Vertical-Adjustment Rails
W Wall
WC Webcam
WM Wall Mount
X Distance from beamsplitter BS to photographic subject PS,
X1 Distance from beamsplitter BS to face-drawing reflection FD-R
XRM X-Ray Monitor
YA vertical Y-Axis
YAH Yaw-Adjustment Holes
YAS Yaw-Adjustment Screw Image files can be created photographically, or by using computer graphics, creating a number of side-by-side images in a very wide single format file that is either specially prepared for use in this invention or is an existing format, such as jpg, which makes loading and accessing the images faster using presently available technology. The end user will see one image at a time on a screen of a portable computing device. For example, note how images IM shown on display screen DS of portable computing device PCD in FIGS. 1 and 2 have varied with movement about vertical V-Axis YA. FIGS. 3 and 4 illustrate the same concept, with a smart phone shown as the portable computing device instead of a tablet device like the iPad™, with a horizontal screen viewing orientation instead of a vertical screen viewing orientation.

Figure 5:
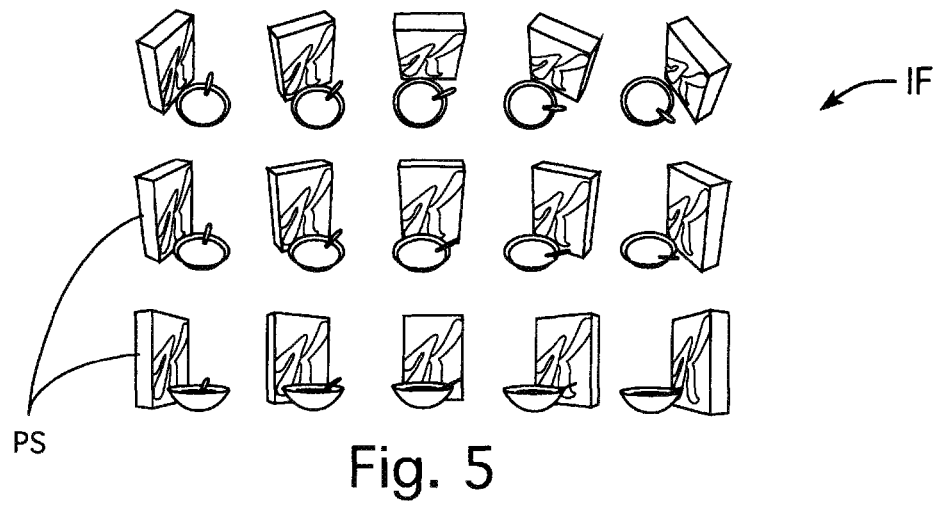
FIG. 5 illustrates an image file for use in the present invention which includes images at multiple pitch and yaw angles.
Figure 6:
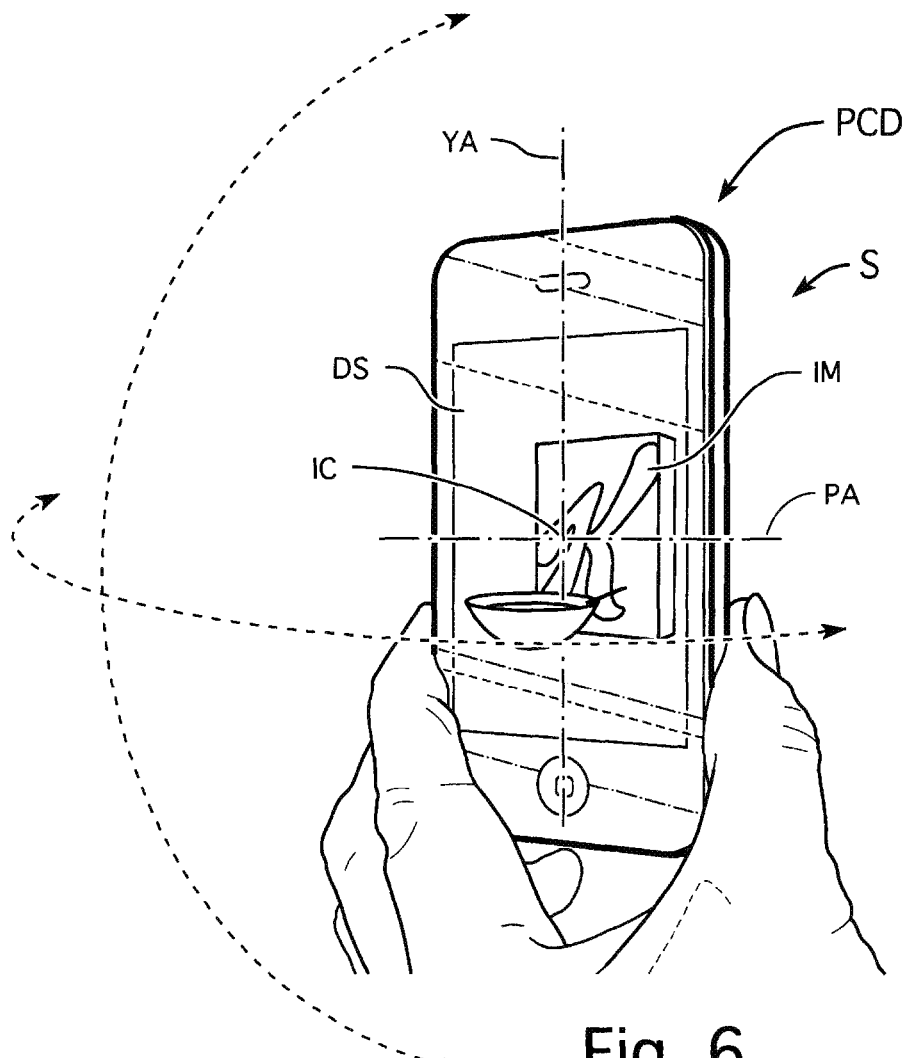
FIG. 6 illustrates display of the image file of FIG. 5 according to the present invention.

FIG. 5 illustrates an image file IF of a photographic subject PS which has been photographed (see FIG. 17) or computer drawn at multiple pitch and yaw angles to create the image file IF for display on display screen DS. FIG. 6 illustrates image 1M on display screen DS of portable computing device PCD showing a photographic subject PS that was photographed from multiple horizontal and vertical angles. Only one view at a time is visible, image IM, however, the outboard images indicate alternate views in the image file IF of FIG. 5 that are automatically called up as the device is wobbled, or turned in pitch and yaw about lateral Pitch Axis PA and vertical Y-Axis YA, to show the appropriate view. Such movement is detected by one or more sensors S contained in portable computer device PCD. It is especially preferred that sensor(s) S be able to detect pitch and yaw movement, such as a gyroscope or an accelerometer, but a single sensor S, such as a compass, can be used to detect movement when image file IF contains only images that vary about a single axis, which will typically be the Y-Axis YA. An example of an image file for which movement only varies about Y-Axis YA is shown in FIG. 24.

Photography.

The goal of the present invention is to provide motion parallax of an original three-dimensional photographic subject, on a flat screen, without the need for 3-D glasses, to be viewed over as wide an angle as possible.

Several boundary conditions influence the choice of rotation angle.

The display screen DS must be kept to within ±90°, otherwise the image will be viewed on edge as a thin vertical line. Further, the narrower the image, the less protrusion is possible of the image, i.e., the rotation angle is a tradeoff with the image protrusion, calling for a happy compromise. To compensate for the narrowing of the image, as the portable computing device is turned around the vertical Y-axis, the width of the image has to be expanded before being displayed. This assures that a sphere in the original scene will be viewed as a circle by the user.

The goal is to have as smooth transition, and small angular increment between images, as possible within the overall rotation angle; however, the more cameras, the higher the cost of a photo booth needed for such cameras, and with more images, the file size is increased which can negatively affect download time.

There are various techniques for creating image files useful in accordance with the present invention; however, the requirements of a photo booth can strongly influence the specifications of an overall system. If a photo booth is designed around a commercially available 16-channel security-system digital video recorder (DVR) and small video cameras are spaced in 4° increments over a total angle of 60°, the image file will contain 16 images, which is an especially preferred embodiment of the present invention. The rotational axis falls at the intersection of the cameras.

Figure 7:
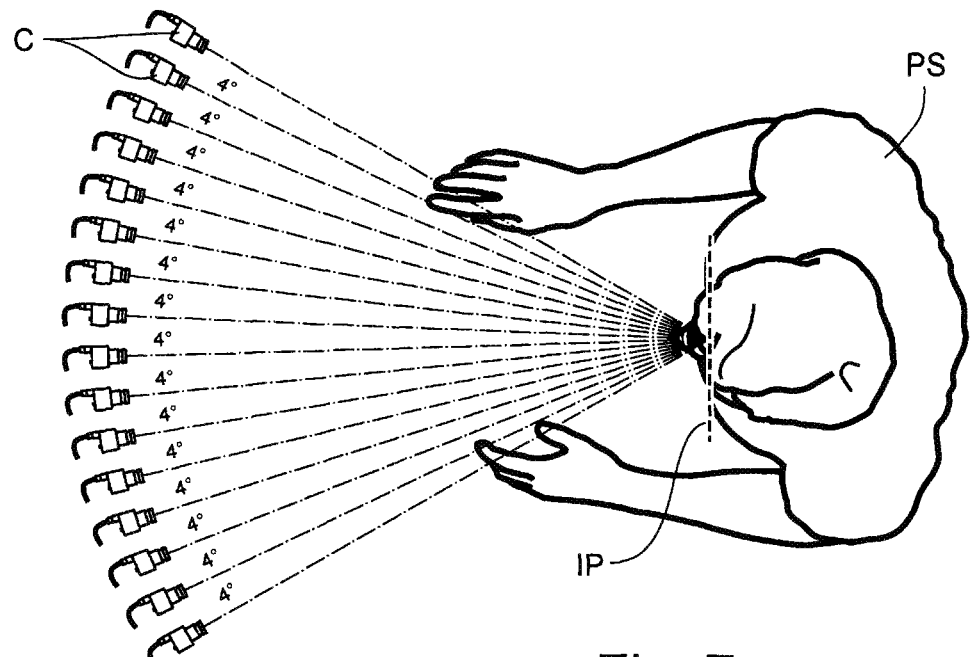
Figure 8:
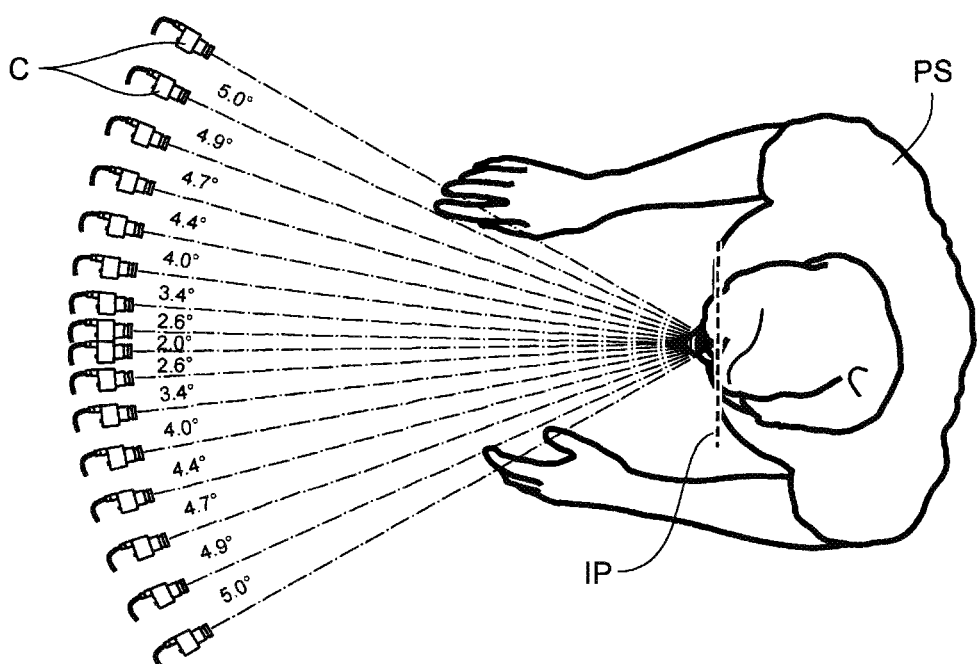
FIG. 8 illustrates a variable spacing of the same multi-camera system.
Figure 9:
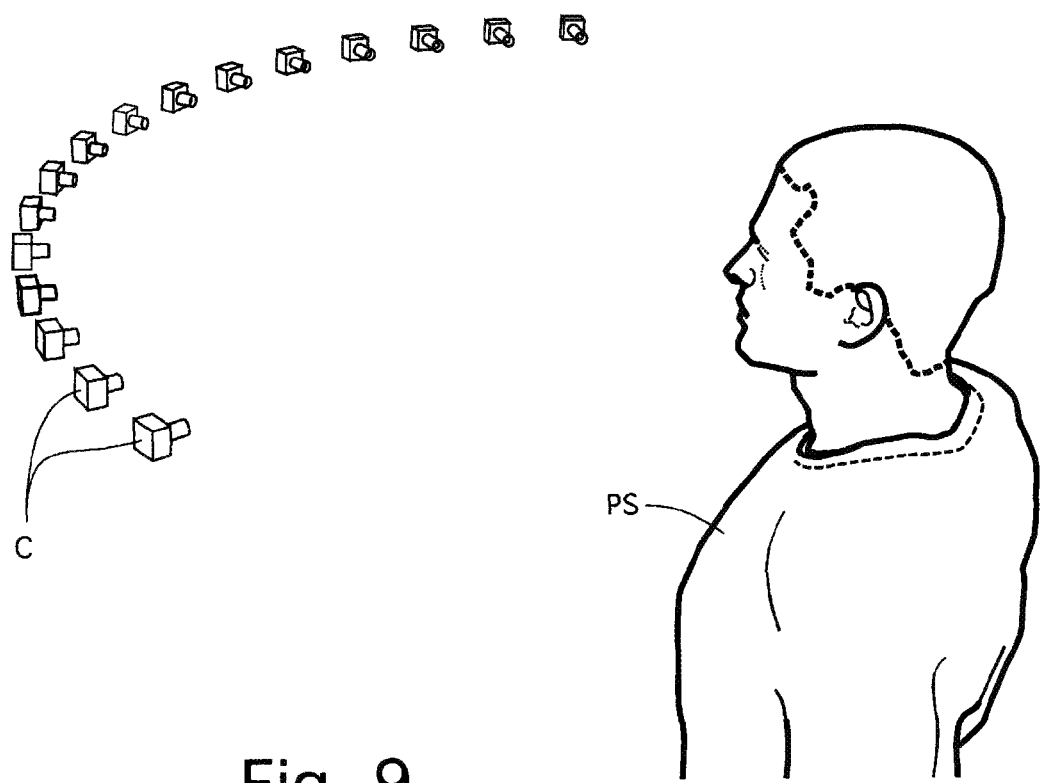
FIG. 9 is a perspective view of the multi-camera system of FIG. 7.

Two approaches are available for the angular spacing between sixteen cameras over a 60° angular spread. The cameras can be uniformly spaced (see FIGS. 7, 9) at a uniform 4° separation or the cameras can be variably spaced, more closely spaced near the center, to give smoother rotation for the middle views (see FIG. 8), which is the preferred choice.

The portable computing device app of the present invention will, in an especially preferred embodiment, open on a center image, and the PCD will be turned through the central images more often than the images at the extreme angles. Further, the display screen brightness is noticeably less bright off axis, reducing the likelihood that a user will be as interested in the wing images as the central images; therefore, variable spacing provides finer angular resolution, and smoother rotary motion near the center where the image will be viewed most often, while providing the same overall angle, and the same number of views.

Image-Acquisition Techniques.

Figure 10:
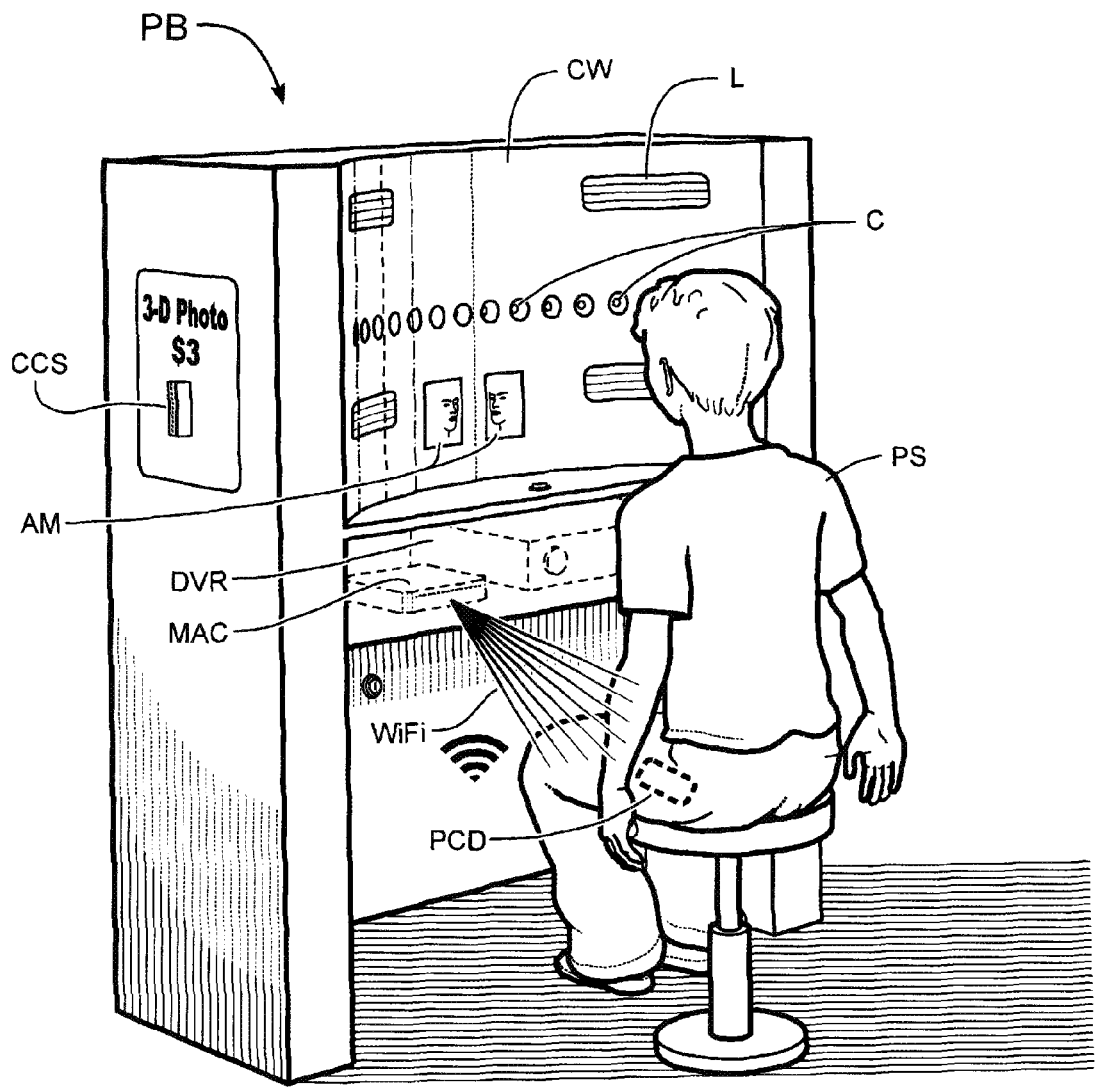
FIG. 10 illustrates a photo booth useful in the present invention.

A first technique for obtaining multiple pictures to use in an image file useful in the present invention is to take multiple photographs simultaneously in a photo, booth PB, an example of which is illustrated in FIG. 10. Photo booth PB has multiple cameras C about curved window CW. Alignment monitors AM assure photograph subject PS is properly aligned and one or more lights L help illuminate the photographic subject. Photo booth PB can include a credit-card swiper CCS or other mechanism (such as a key fob reader or smart card reader) for collecting payment. Digital video recorder DVR receives the output from each of cameras C which is used to create a 3-D picture according to the present invention (which will hereinafter be referred to as a Popix3D™ picture). A computer MAC can process the output from the DVR to create an image file which is then received by the photographic subject by a suitable transmission means, such as WiFi.

In order for all images in photo booth PB of FIG. 10 to register on the portable computing device screen it is important that the multiple cameras C be aligned and aimed at a common convergence point slightly behind the front of the photographic subject's face so that a portion of the face will appear to protrude a the front of the display screen DS. There are slight manufacturing differences in the cameras, and differences in the mounting of the cameras which must be compensated for. To preserve the precision of the camera alignment, and minimize the cost of the adjustment means, a simple single-piece flexure mount is used, made of a single flat piece of sheet metal bent into a complex form.

The shape of the flexure mount allows for independent pitch and yaw adjustment. Flexure hinges, are created in the metal part with a series of holes to weaken the part, FIGS. 10a, 10c, 10d, 10e. Each camera is adjusted by placing an alignment target, not, shown, at the image plane IP and individually viewing the cameras' images on a video monitor, and adjusting each camera for pitch and yaw.

Figure 12:
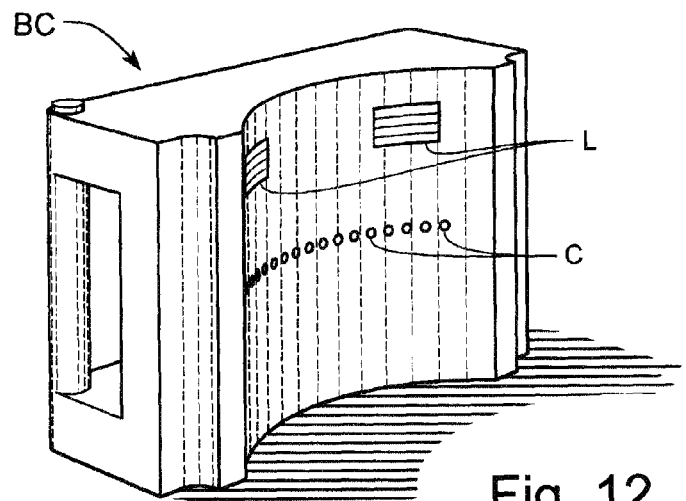
FIG. 12 illustrates a portable camera assembly useful in the present invention and FIG. 13 illustrates it in use on a baby basinet.
Figure 13:
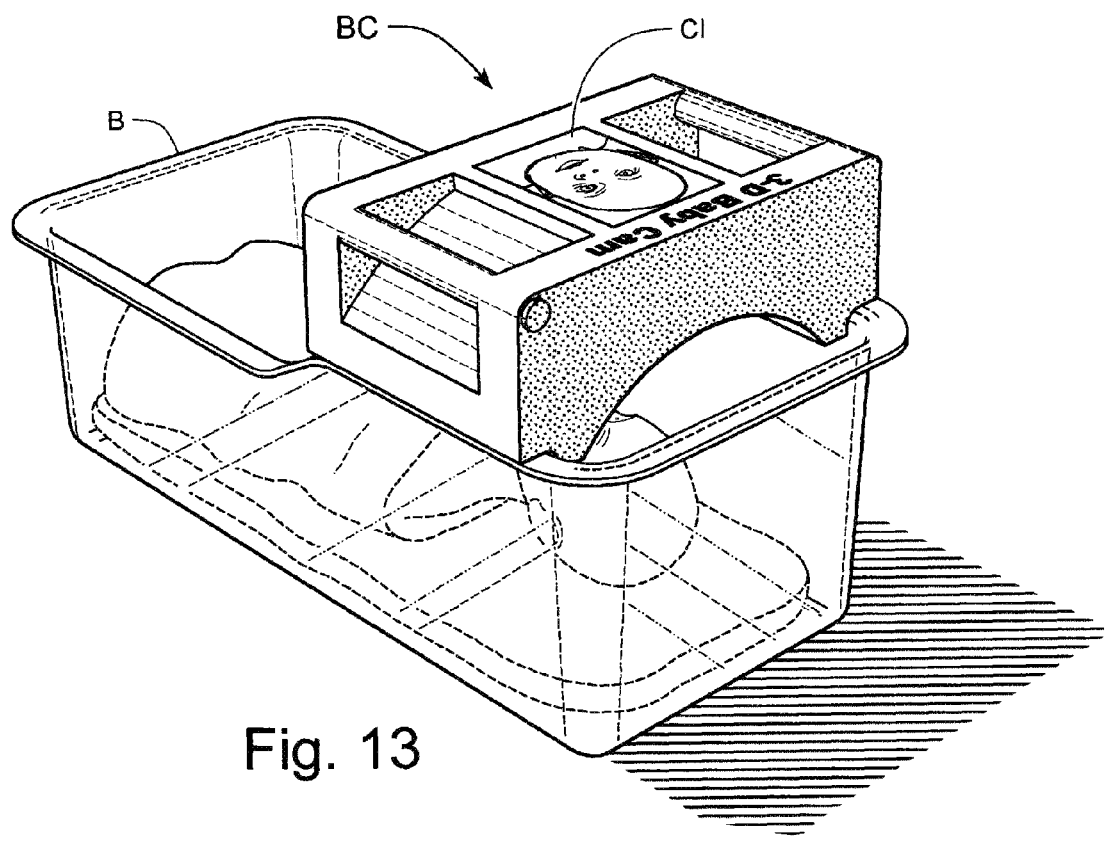

A second technique for, obtaining photographs to use in creating a Popix3D™ picture is to design a camera assembly whose function is similar to that of a photo booth, but without the need for a photo booth. For example, a police-vehicle-mounted 3-D camera assembly, CA, can be used by law enforcement personnel when they stop someone. If the person being stopped does not already have a driver's license with a lick to a Popix3D™ picture (which is discussed later), for confirmation that they are who they say they are, the law enforcement personnel can use the vehicle-mounted 3-D camera to take a Popix3D™ picture which can be stored on a cell phone, PDA, tablet or other portable computing device and transmitted back via a network to headquarters and stored for future reference. Another example can be found in connection with baby pictures. A small baby camera BC can be made to fit the basinet B in maternity wards to take a Popix3D™ picture of newborns (see FIGS. 12 and 13). This should be popular with parents, and might also be a liability reducing measure for hospitals to reduce the chance of swapping babies.

A third technique for obtaining photographs to use in creating a Popix3D™ picture is to have head shots taken by professional photographers, not shown. This technique is more expensive, but allows for greater quality images and control of such images, so it is a more likely choice for high-profile people such as entertainers, celebrities, political candidates, etc., especially if the photographs are also to be touched up by the photographer.

A fourth technique for obtaining photographs to use in creating a Popix3D™ picture is to use a single camera that is itself rotated about a photographic subject positioned at a fixed point. This can be done, for example, by using a wall-mounted swing arm SW (see FIGS. 14-16). In this technique a single camera C is supported in an arm that swings in an arc around the photographic subject, PS, a person who is positioned against the wall, automatically centered between the vertical supports of the wall-mounted frame WM of the device. The camera assembly is vertically adjustable to the subject's height within the wall mount WM on vertical adjustment rails VAR. As the arm swings, the camera snaps 16 individual photos over the angle of 75°. The arm carries a light L, and when the photos have been taken, the arm returns to a docking position DP against the wall. The rotational axis RA of the swing arm is positioned just behind the chin so that the chin, nose and forehead will protrude off the front of the portable computing display device. It would be simple to add a height chart on the wall behind the subject to use the camera to take mug shots in a police station or wherever such shots might be needed (see FIG. 33).

Figure 17:
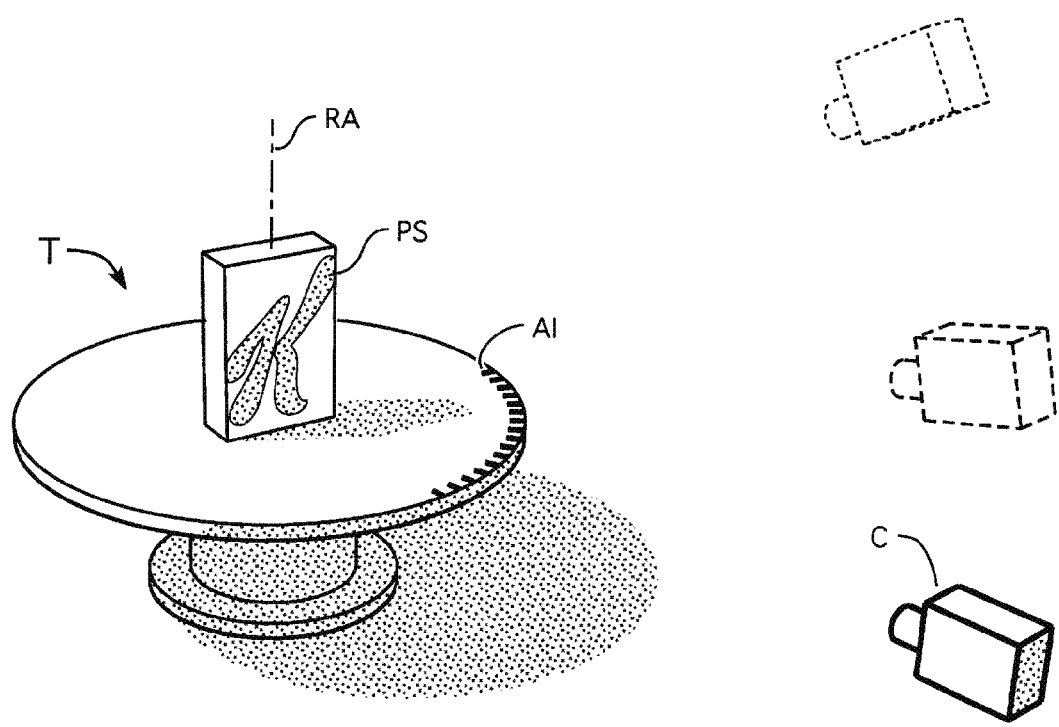
FIG. 17 illustrates a photographic technique useful in the present invention in which a camera is located in a stationary position (which can be varied as illustrated by the dotted line outlines of the camera) while a photographic subject is located on a movable turntable.

A fifth technique for obtaining photographs to use in creating a Popix3D™ picture is to use a single camera that is itself held stationary while a photographic subject is rotated about a fixed point. A good example of this technique is to use a turntable with a single camera as is shown in FIG. 17 which might be used by commercial product photographers who take pictures of products for advertising. In this technique, turntable T is rotated about rotational axis RA while camera C takes pictures of photographic subject PS.

Figure 18:
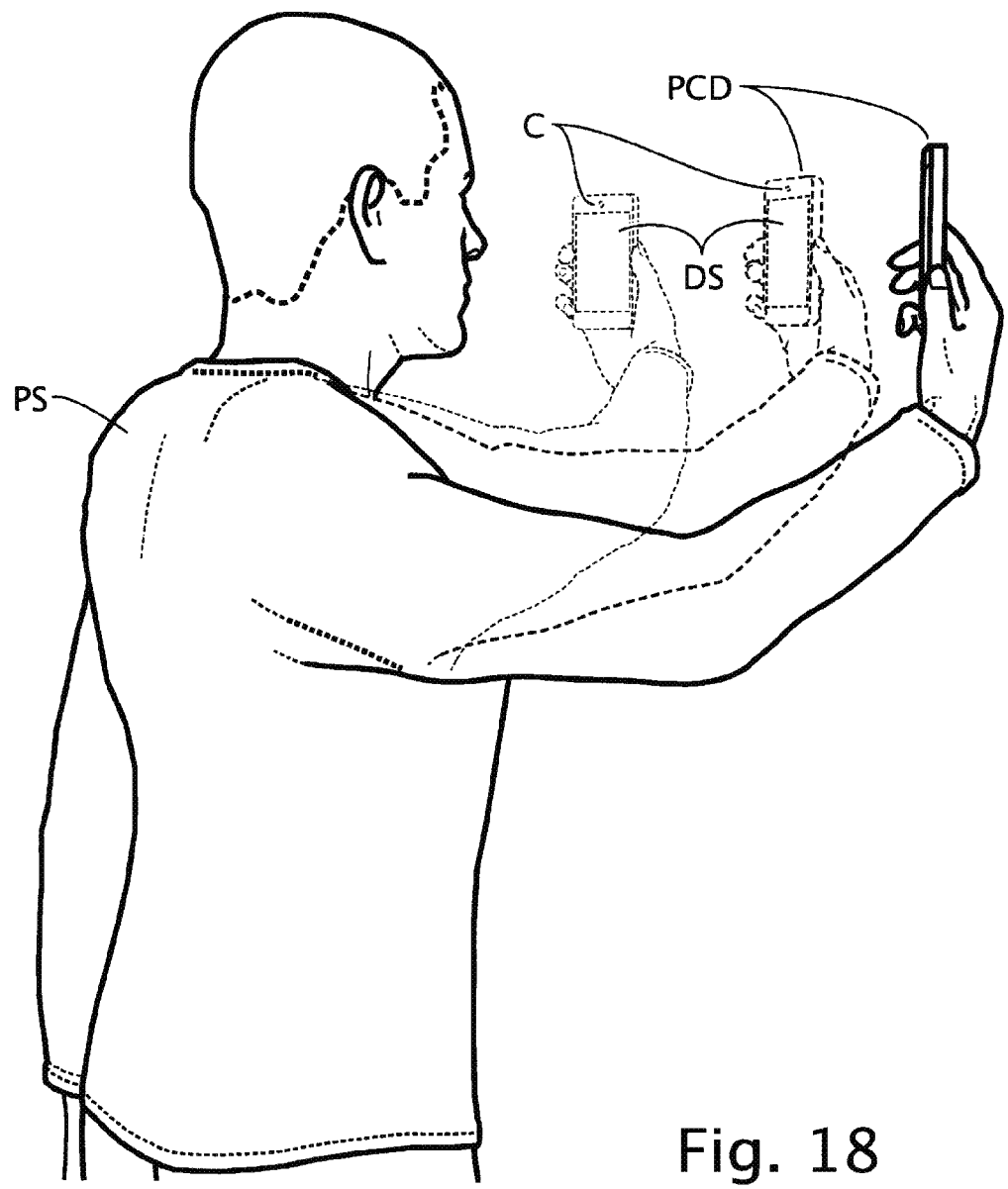
FIGS. 18 and 19 illustrate do-it-yourself photographic techniques useful in the present invention.

Although the fifth technique will work well when the turntable and positioning of the photographic subject are carefully controlled, the technique will also work even when it is not so carefully controlled. For example, this technique might be adopted by individual do-it-yourself users. A simple way in which this might be done is for people to take their own photos with their cell phone or digital camera held out at arm's length and swinging the camera in an arc around their face (see FIG. 18) although some practice may be required for this technique to work.

Figure 19:
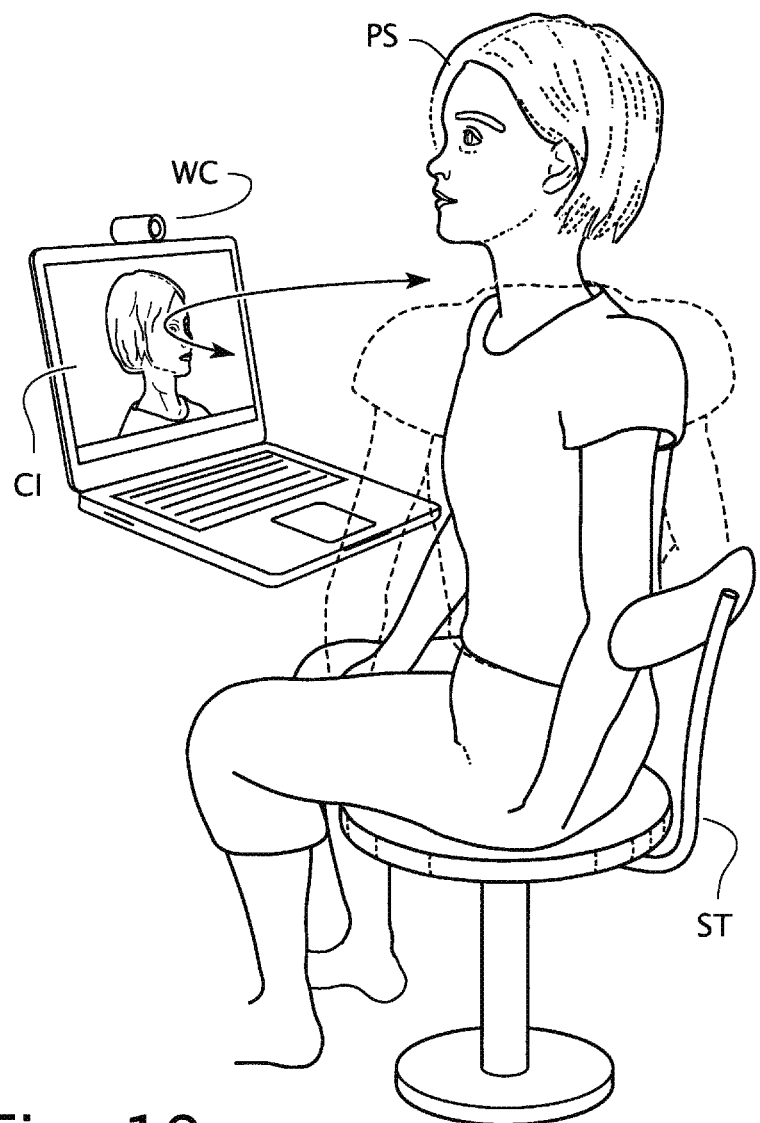

A do-it-yourself user might also sit on a swivel chair in front of a camera and rotate the chair about the camera (see FIG. 19).

As an alternative to such crude do-it-yourself measures, or to improve the quality of such efforts, a user might rely upon software that is currently available over the Internet that allows users to take their own multiple photos to help them create a Popix3D™ picture. In this regard, 360° image-formatting software is available from 3D Bin, http://3Dbin.com, which provides three free uses, with additional use for a monthly fee. This software provides image alignment, or centering, useful for the hand-held cell phone photography described above and in FIG. 18. Web Rotate 360 provides software for formatting turntable photographs into a single rotatable movie (it provides a free version and sells a professional version). In addition, 360° turntable photographic services are provided by www.3Drev.com, www.360DegreeViews.com, and www.TogglePhotos.com, and 360° turntable photographic equipment (turntable, lights, etc.) are available from by www.Pamco-Imaging.com.

Figure 20:
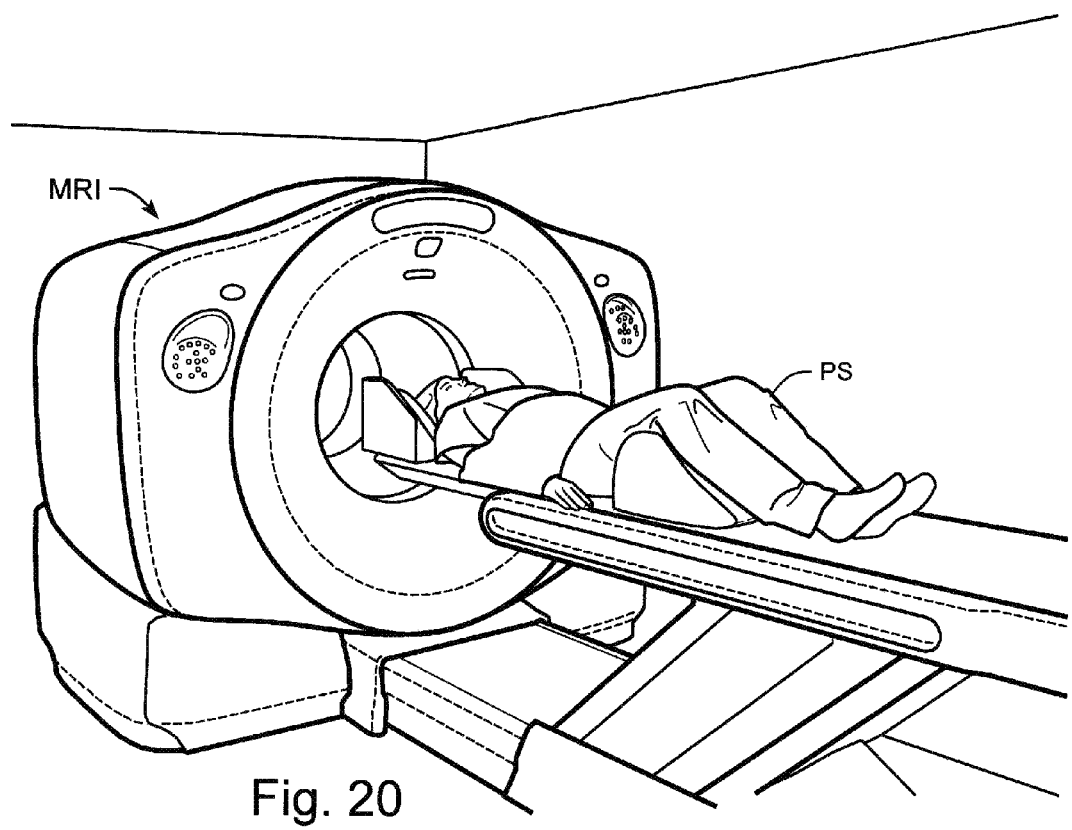
Figures 21, 22:
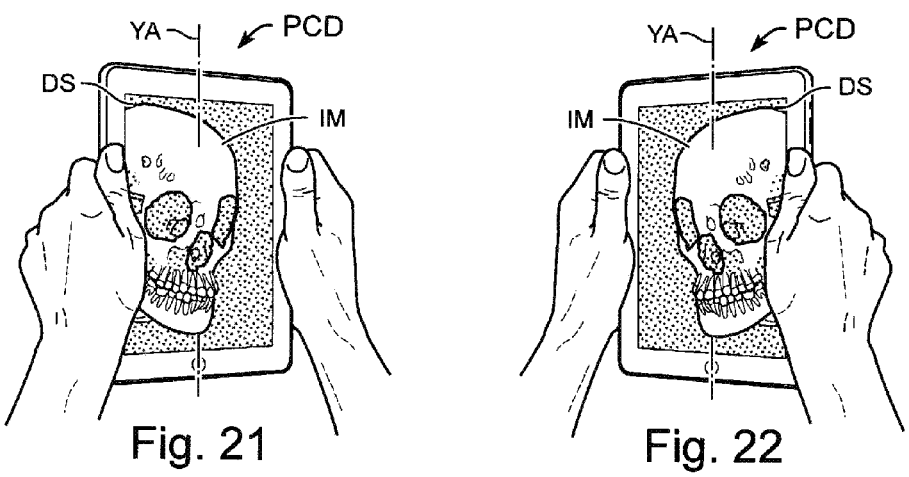
FIGS. 21 and 22 illustrate display of images obtained from the MRI data file in accordance with the present invention.
Figure 28:
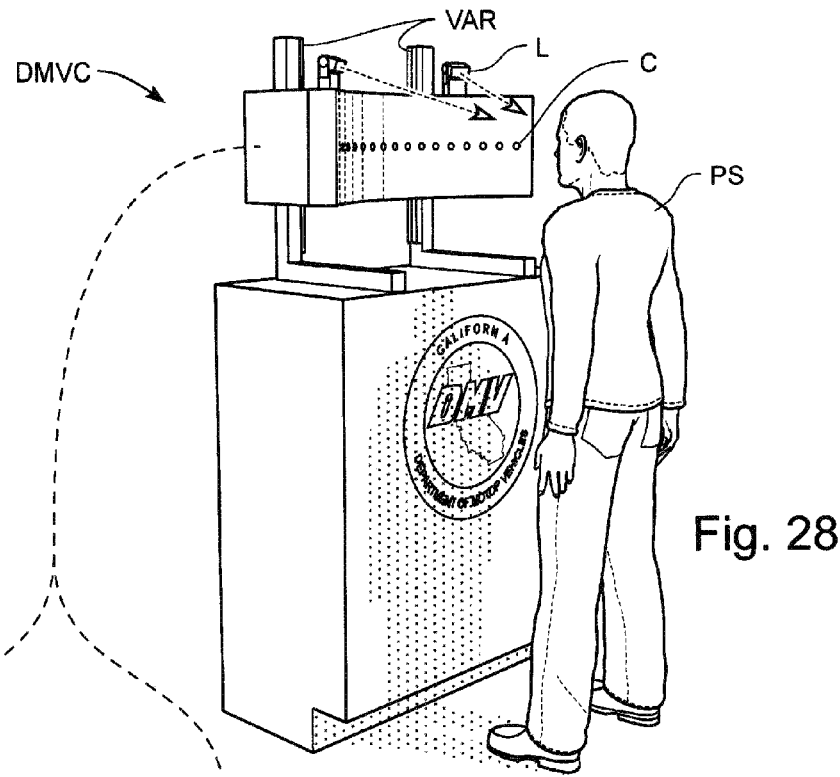
Figure 29:
Figure 30:
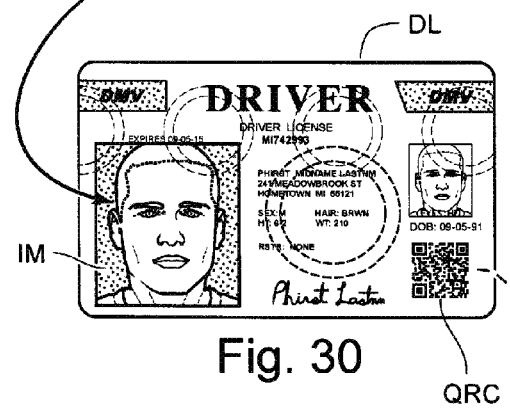
Figure 32:
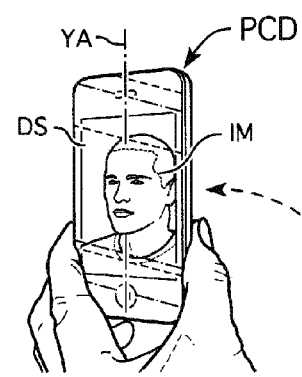
Figure 31:
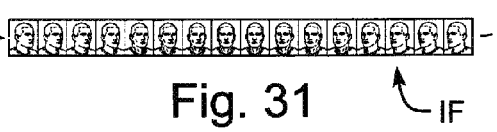

It should also be noted that a Popix3D™ picture in the required file format need not necessarily be taken with conventional cameras. Multi-view medical diagnostic images currently available, such as images available from MRI (Magnetic Resonance Imaging) and CT Scan (Computerized Axial Tomography) machines, FIG. 20, can be displayed as motion parallax files using software applications according to the present disclosure. Such use could allow doctors and hospitals to have instant access to three-dimensional images of all their patients (see FIGS. 21, 22.

Some Potential Uses for a Popix3D™ Picture.

A Popix3D™ picture is much more interesting, and provides much richer detail, than a simple image. Accordingly, whenever and wherever a simple photograph might be used in connection with a person or an object, a Popix3D™ picture might be used instead. For example, Facebook® has become a global phenomenon in a relatively short time. One aspect of Facebook®, and other social networking sites, is that an individual user can choose a photograph that is associated with the user's name. It would be a simple matter to choose an image from a Popix3D™ picture for that picture and allow users to view the entire Popix3D™ picture based upon the teachings set forth in this application. The same could be said for websites that contain celebrity pictures, and this could be a prime use for the professional photographer technique noted above.

Another major potential use for Popix3D™ pictures is any situation in which richer detail would be useful for identification, such as for an identification card or the like, such as a passport, or some other form of identification object. In this application a Quick Response code QRC (such as a barcode) can be included with the identification card or passport when it is originally issued or added later, an example of which can be applying an adhesive label to such an identification object.

Use of a Quick Response code tied to a Popix3D™ picture to confirm the identity of a person (or thing) can provide a powerful tool for capturing and documenting 3-D information quickly. For example, at an airport, passengers can be required to have a Popix3D™ picture taken as part of the security screening process before boarding a flight (see FIGS. 23-27). Once the Popix3D™ picture is taken an adhesive label can be applied by a TSA agent that can then be scanned later by another Customs or TSA agent, which can bring up the Popix3D™ picture to confirm the identity of the person. Continuing with this example, as the traveler passes through a security check point at an airport, a QR code reader reads the QRC and the Popix3D™ picture is retrieved via a network and then displayed on a display screen (which need not necessarily be a portable computing device, but could also be a desktop computer or the like) that can be rolled over with a mouse or trackball or some other device. The TSA computing device can retain the Popix3D™ picture (or send it to memory storage through a network) as a record of who passed through that checkpoint, for future reference. If that passenger later becomes a threat, the Popix3D™ picture could be distributed to TSA agents at various locations via one or more networks. Such a system can also be used in connection with objects, such as at auctions, to document and confirm the condition of an object at various times.

In the last example it was assumed that the Popix3D™ picture was created close in time to its use. However, this need not necessarily be the case, since a Popix3D™ picture might be taken in a Popix™ photo booth as part of the process of applying for or obtaining an identification card, passport or the like. In such a situation, one of the central images (such as the $8^{th}$ or $9^{th}$ image in a 16 image file—see FIG. 34 for frame numbering) could be used as an identifying picture in the card or passport, and a Quick Response code could be permanently included in the card or passport so that the Popix3D™ picture can be accessed later through use of a network.

Another use similar to the airport security use just described would be to use a Department of Motor Vehicles camera to produce 3-D driver's licenses (see FIGS. 28-32). Instead of the conventional 2-D photograph used by DMV's today, a 3-D picture can be taken with the central picture being used conventionally and printed on the driver's license along with a QR code which, when scanned by a policeman, links to the Popix3D™ picture for confirmation of identity and driving record.

Figure 33:
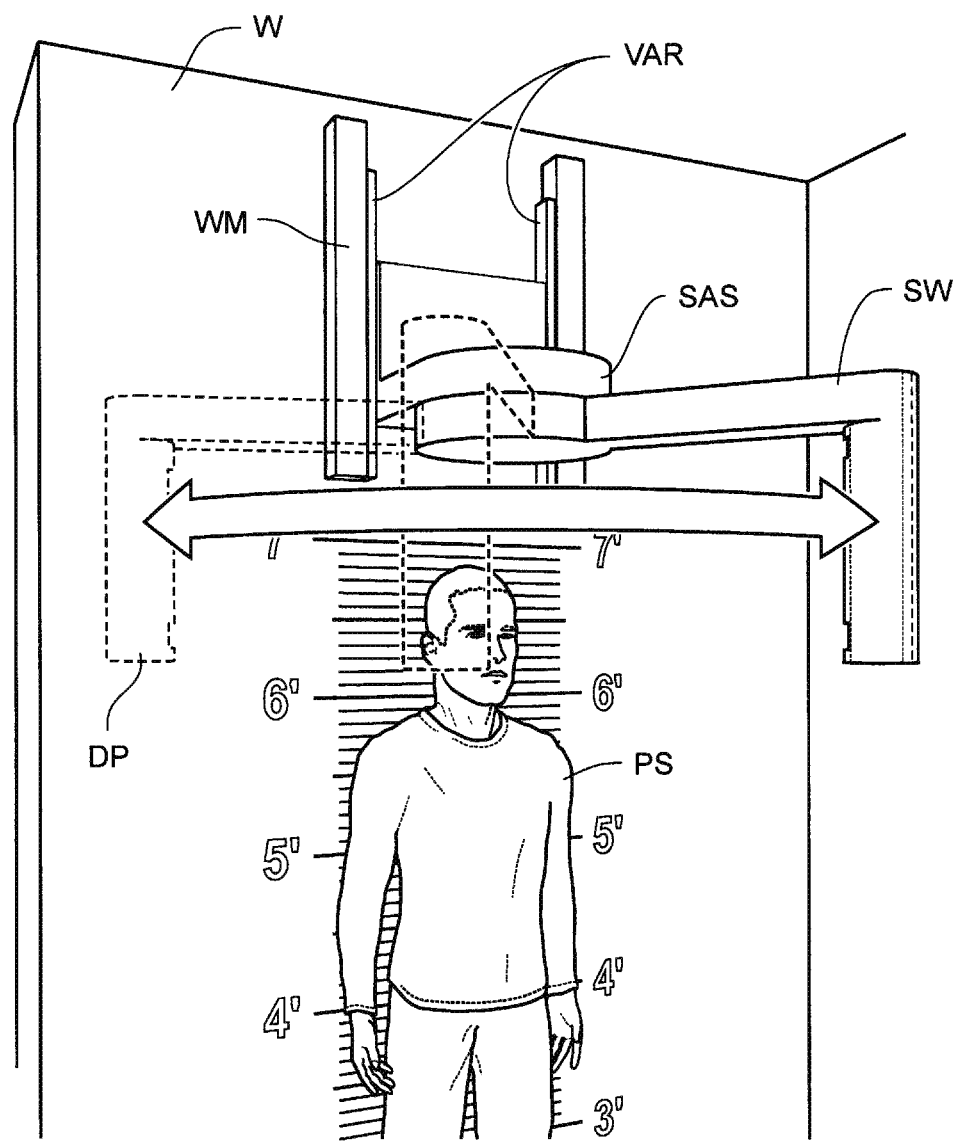
FIG. 33 illustrates a use of the present invention similar to FIG. 16 except that the image file can be used instead of a mug shot.

Another use of the Popix3D™ picture is for mug shots (see FIG. 33). It is typical today for police and law enforcement personnel to use a mug shot camera when they book criminals. However, conventional 2-D front and side view mug shots do not necessarily provide a realistic impression of a person. Further, these views can miss an identifying detail, such as a scar or a birthmark, which could be shown using a Popix3D™ picture because of the increased information contained in multiple photographs from numerous angles. The ability to capture unique identification, which may not be symmetrical from different viewing angles, is a great advantage of using photography to capture images according to the present invention. Of course, computer generated images can also vary from angle to angle, and contain unique information from frame to frame, but somebody or something (such as an app) has to have input so as to create the variance whereas photography does not seek to predict or make such changes, but to capture what is actually present in the real world.

The use of a Quick Response code QRC, such as a barcode, can also be used as a powerful link in advertising to a computer readable medium or to a website containing advertising information. Thus, for example, an entertainer or celebrity picture might appear in a magazine (which is necessarily a 2-D format) with a QRC that links to a webpage where a Popix3D™ picture can be viewed or a QRC could appear in a pop-up or banner ad or the like to link to other webpages. In both of these examples, the advertisement containing the QRC would not contain the image file that is linked to the QRC and some further action would be required to access the image file.

Software Apps.

Two software applications are used to make it possible to view Popix3D™ picture on a display screen. The first software app is what is used by a portable computing device to open and view the multi-image file of a Popix3D™ picture.

The second software app is used by a photographic computing system to format a Popix3D™ image file.

Figure 11:
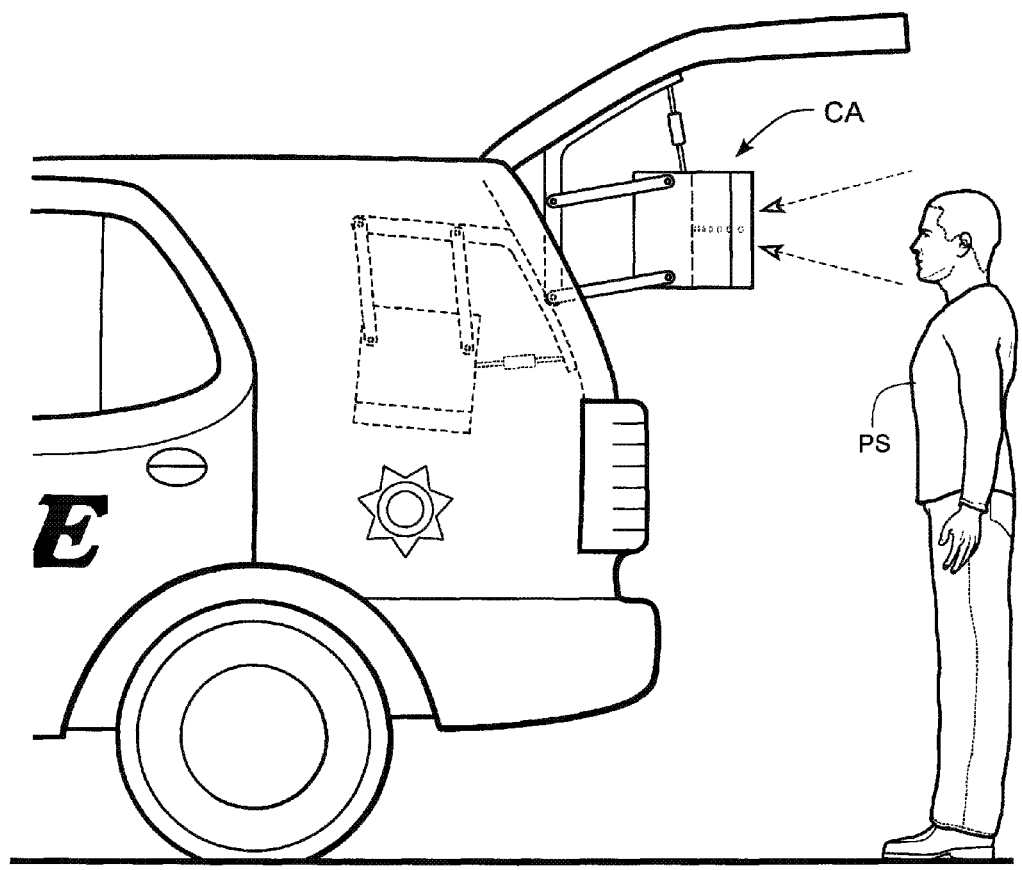
FIG. 11 illustrates a car mounted camera assembly useful in the present invention.

The photographic computing system may use one or more processors configured to execute said one or more computer program modules and it may reside in a photo booth or specially designed device that is used to take pictures (e.g., those found in FIGS. 10-12) or to format raw-camera pictures, or it may reside in one or more computing systems. Although it is envisioned that the photographic computing system will reside in a separate device from the PCD, this is not a requirement in all circumstances, especially as PCDs increase in capacity and function, and it is possible that the photographic computing system can reside in the PCD for some applications, such as do-it-yourself applications discussed in greater detail below.

Image Formatting.

Figure 34:
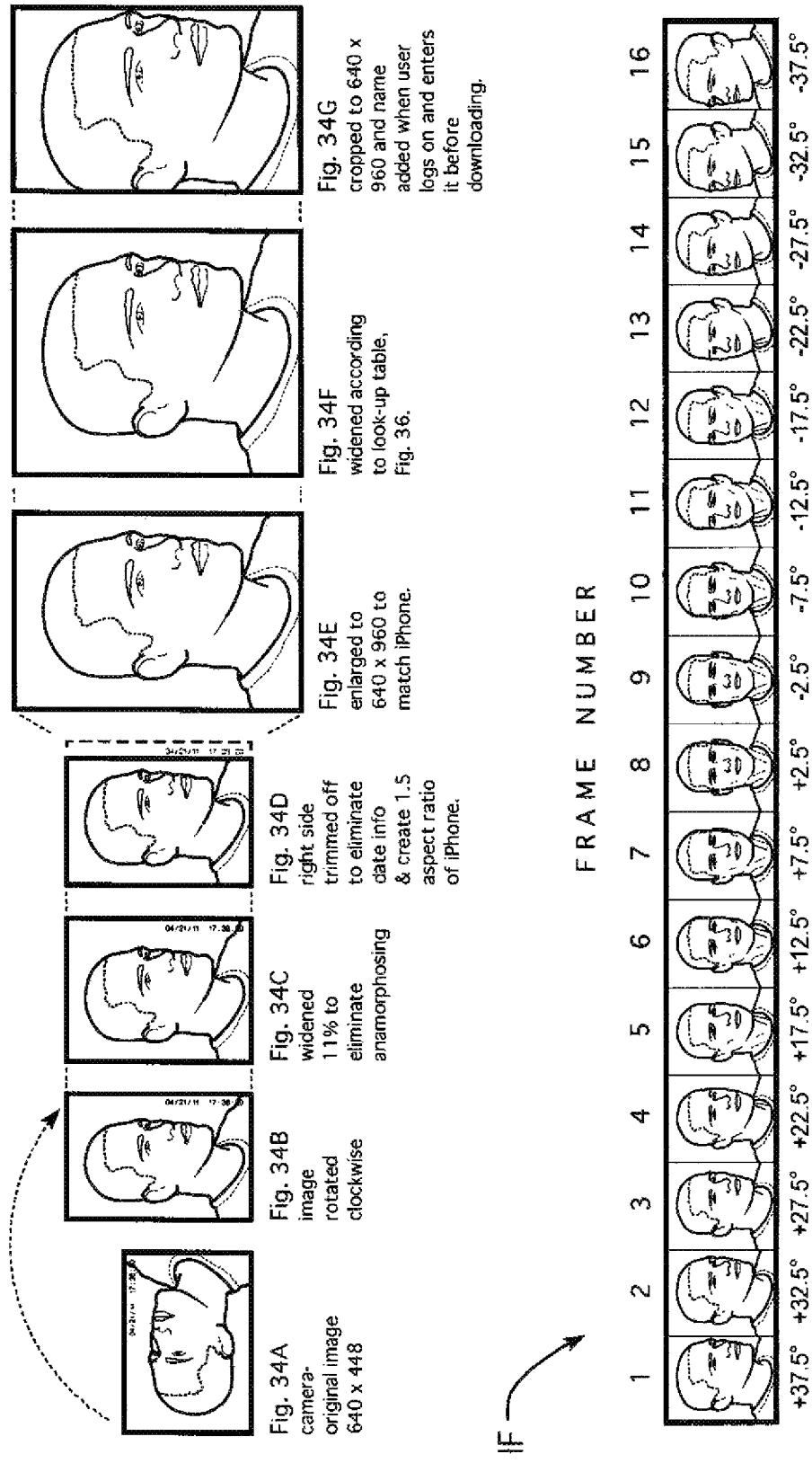

Image formatting is the same concept regardless of picture source; however, each version has its own slightly different requirements. The steps shown in FIG. 34 are used in an especially preferred embodiment to format pictures from a photo booth such as is shown in FIG. 10.

To maximize the resolution, the cameras C, are rotated 90° on their sides in photo booth PB. As a result the normal landscape format image (wider than high) of the security-video system is rotated to a portrait format (taller than wide), FIGS. 34a and 34b, which, is better suited to the headshots displayed on the portable computing display devices.

The cameras anamorphosed the images and FIG. 34c shows the width of the image being expanded 11% to compensate, so that a sphere in the scene will photograph as a circle, not an ellipse.

The security-video system adds a time and date stamp to all video which is shown being trimmed off in FIG. 34d. To retain maximum resolution, the image is cropped to meet two criteria, (1) to trim off the time and date stamp on the right side, and (2) to establish the aspect ratio of the screen on a portable computing device PCD (iPhone®, iPad®, etc.). This requires trimming off only the right side to lose the time/date stamp, without trimming the left at all. The 1.5-aspect ratio of the image in FIG. 34d matches that of the Apple® iPhone®; however, the image could be formatted for the 1.33-aspect ratio of the Apple® iPad®, or other PCD.

FIG. 34e simply enlarges the image to match the dimensions of the iPhone® screen, 640×960 pixels.

Figures 35, 36:
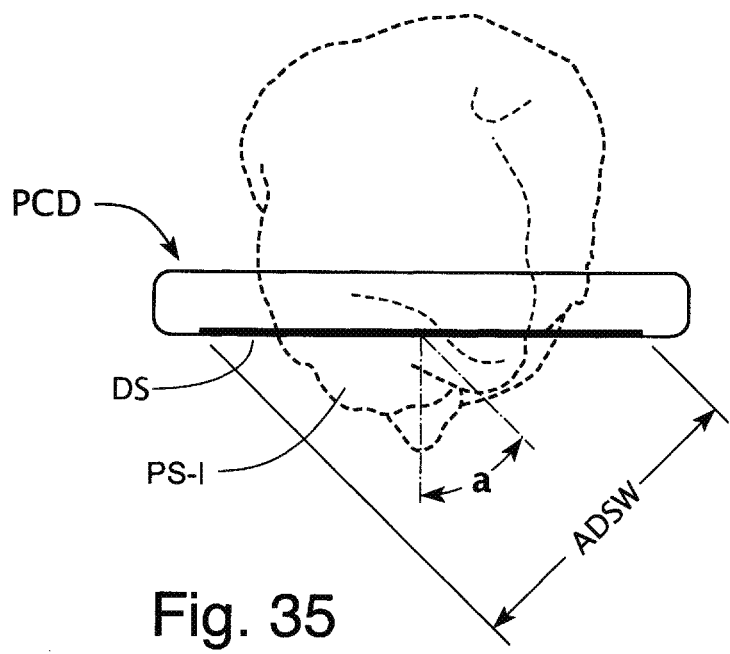
FIG. 35 shows a point of reference for off-axis angles of a screen set forth in FIG. 36 which are used in the process of FIGS. 34a-h.

In FIG. 34f, the width of the image is expanded according to the look-up table in FIG. 36 to compensate for the apparent narrowing of the image when viewing the screen from off axis to the side, FIG. 35.

In step 34g, the width is again cropped to match the screen of the intended portable display device sizes shown to match the Apple® iPhone®.

Plus (+) angles are assigned on the subject's right side; and minus (−) angles on the subject's left, in 5° increments over a ±37.5° arc. These are set forth in the following table:

TABLE 1

| Image number | Angle |
| --- | --- |
| 1 | +37.5° |
| 2 | +32.5° |
| 3 | +27.5° |
| 4 | +22.5° |
| 5 | +17.5° |
| 6 | +12.5° |
| 7 | +7.5° |
| 8 | +2.5° |

TABLE 1-continued

| Image number | Angle |
| --- | --- |
| 9 | −2.5° |
| 10 | −7.5° |
| 11 | −12.5° |
| 12 | −17.5° |
| 13 | −22.5° |
| 14 | −27.5° |
| 15 | −32.5° |
| 16 | −37.5° |

As shown in FIG. 34h, 16 images comprise a single jpg image file, IF, which is then sent by wireless connection ("Wi-Fi") to the user's PCD while still in the photo booth. All images are side by side, with no space, FIGS. 34h.

When a person steps into the photo booth, and swipes their credit card or inserts cash into a bill acceptor, the validation activates the lights and records 30 seconds of time which gives the person time to read the instructions, to get in position, and push the red button (to fire a flash to make them think that's when the picture was taken). Two video reference monitors show images from outside cameras, #1 and 16. The monitors are overlaid with drawings of a generic face which the subject uses to align the subject's own face. When they are aligned with these monitors, they are at the correct position for all cameras, and the subject's face will protrude slightly off the PCD screen.

Photo booths have been in use since 1889. The original booths used consumables including photographic print paper and caustic chemicals which frequently had to be replenished. Some more recent booths were simplified by using Polaroid® instant-processing film. Current photo booths use digital cameras and ink-jet color prints. Other than electrical power, the photo booth of this invention is unique in that it requires no consumables, and therefore is virtually maintenance free and self sustaining. All activity and operations are electronic. The pictures are formatted immediately and sent to the user's portable display device (or available for downloading into a computer-readable medium) before leaving the booth.

For increased revenue, the photo booth of this invention could also incorporate an ink jet printer to produce a strip of conventional photos.

Alternately, if the photo booth has an Internet connection, an operator at a remote location can use the PC software that comes with the DVR to do the steps above.

The inherent video recording capability of the security-system 16-channel DVR provides the means for shooting video clips with sound where the user steps into the photo booth and records a short video, birthday greeting, etc. This would increase the file size to have multiple synchronized video clips, but may be practical in the future with faster hardware. This would be useful to advertisers or political candidates who want to make a campaign statement, or for entertainment programming, creating a new broadcast format. This could appeal to motion-picture studios to show clips from an animated 3-D movie where it would be easy to generate the additional views from the existing computer model.

Face-Alignment Techniques.

Figure 37:
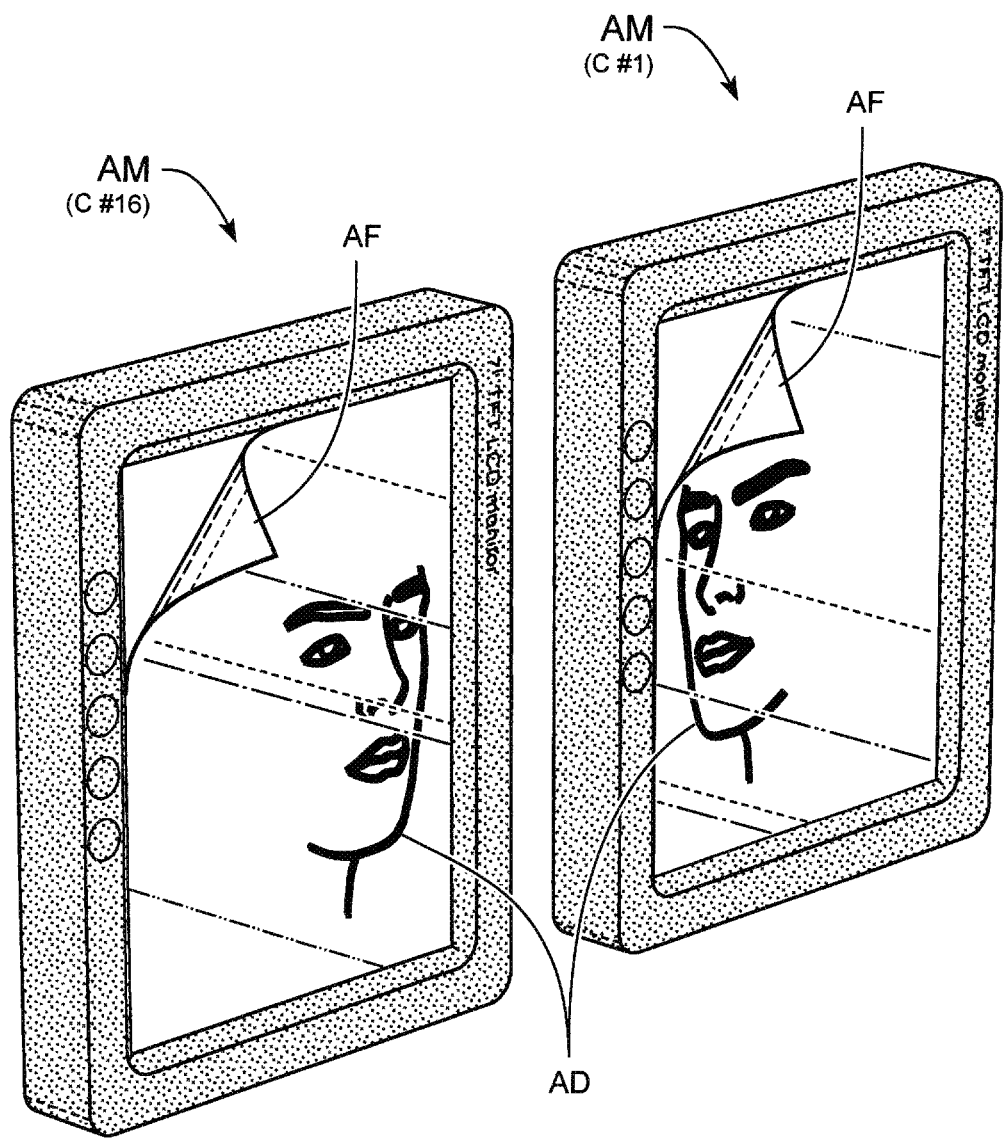
FIG. 37 illustrates one face-alignment technique useful in the present invention which uses a reflection of a face with a schematic drawing of a face.

It is important that photographic subjects PS have their face aligned properly so that a portion will be forward of display screen DS on portable computing device PCD. There are various ways that a photographic subject can align him or herself relative to the cameras, including displaying video images from outboard cameras on video alignment monitors AM (see FIGS. 10 and 37). This uses schematic drawings of a generic face printed on transparent alignment film AF which is positioned (laminated or taped) on the front of the video alignment monitors AM. The line drawings of the face are symmetrical copies and can be printed identically, with one applied face up, and the alternate one flipped over.

Figure 38:
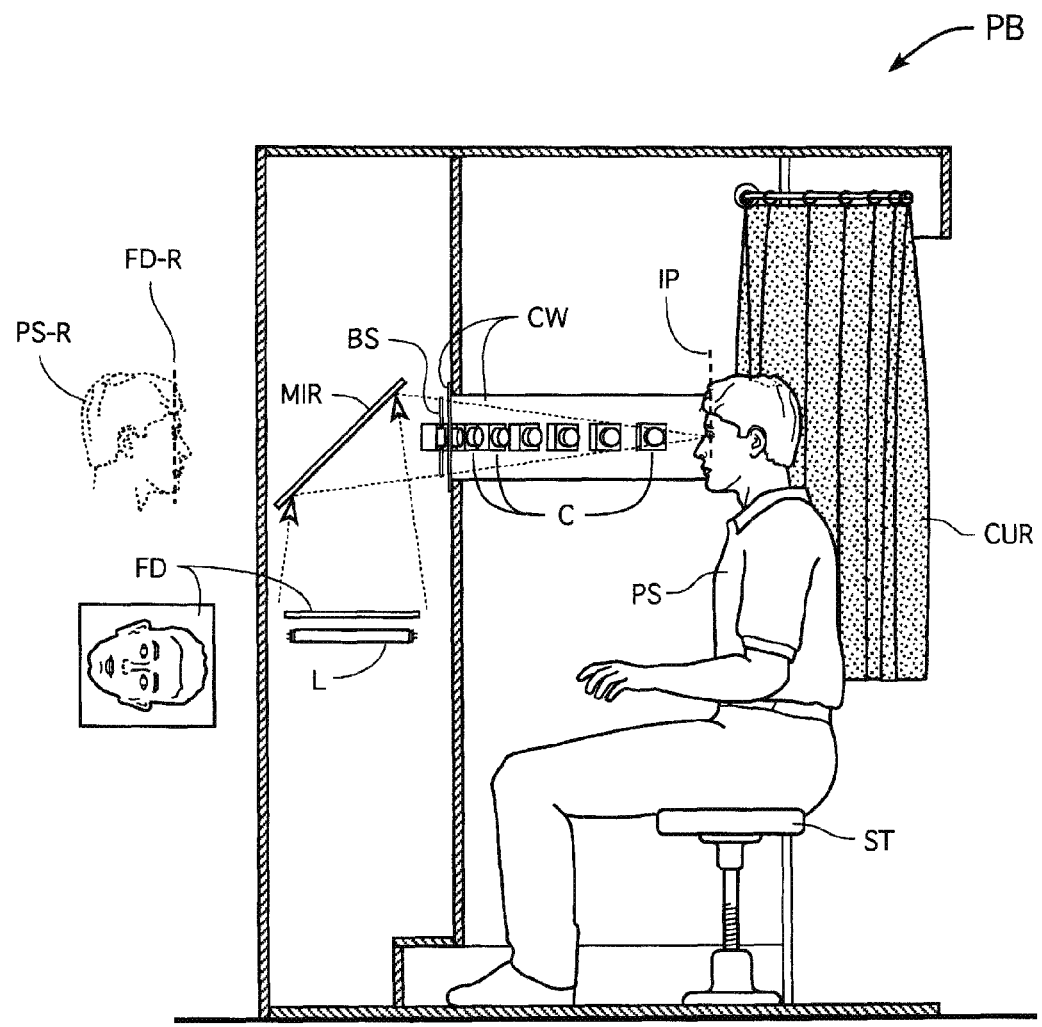
FIGS. 38 and 39 illustrates a second face-alignment technique useful in the present invention which uses a beamsplitter.
Figure 39:
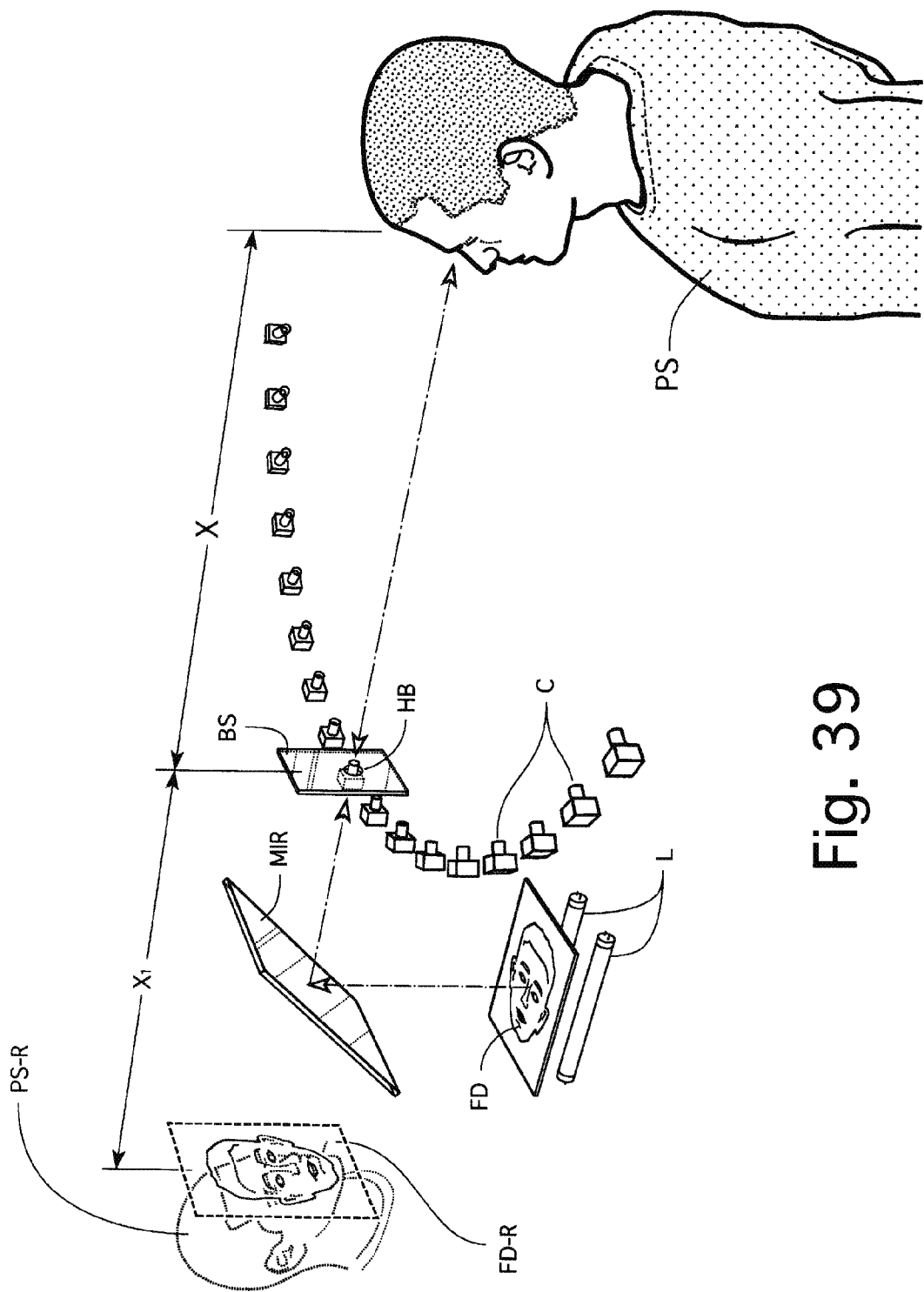

An alternate face-alignment technique is X-Y-Z registering of a reflection of a face with a schematic drawing of a face (see FIGS. 38 and 39). The photographic subject adjusts the stool ST for the correct height, and by comparing his or her own reflection PS-R in the beamsplitter BS to the position of the generic face drawing FD, the correct vertical and lateral position can be obtained to position the head very accurately at the image plane IP. Longitudinal alignment is achieved through use of depth perception of the photographic subject PS by comparing the distance of their own reflection relative to the generic face drawing FD. Simply to make the photo booth more compact, a folding mirror MIR reflects the actual face drawing FD to appear at the reflected position of the face drawing FD-R.

Figure 40:
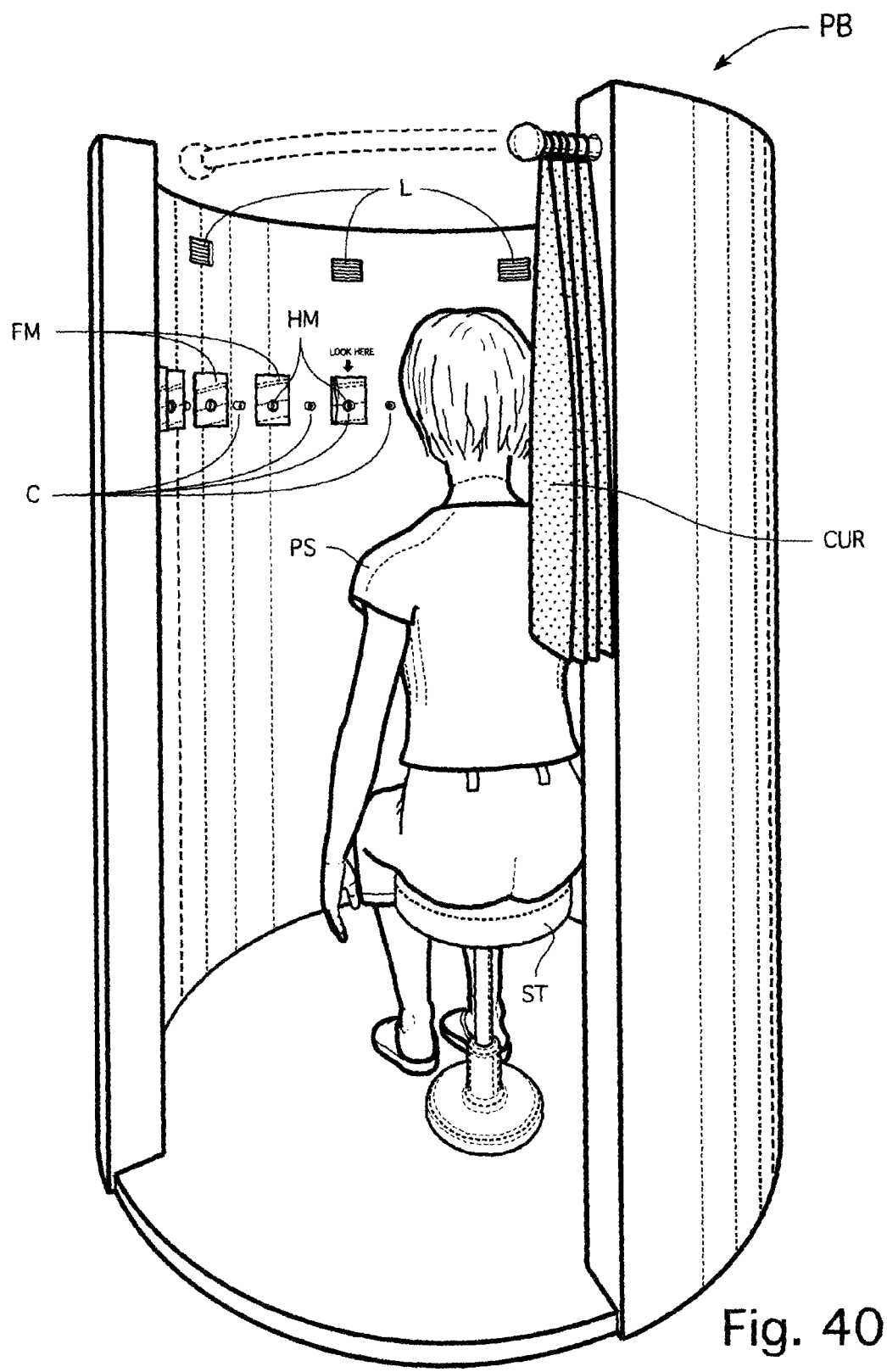
FIG. 40 illustrates a third face-alignment technique useful in the present invention which uses multiple face mirrors.

Another face alignment technique uses multiple face mirrors FM all perpendicular to the desired head position (see FIG. 40). When the photographic subject is properly aligned the subject will see his or her face in all the mirrors, which is an intuitive position to be drawn into because people like looking at themselves. In this position, the faces will be at the convergence point of all the cameras because of the design of the photo booth PB.

A variation of the face alignment technique uses two or more mirrors MIR that are large enough so as to allow the photographic subject, when properly positioned, to see an iris and pupil, but not so large as to lose positioning accuracy. The two or more mirrors should not be parallel to each other. A single mirror allows the photographic subject to be properly aligned vertically and laterally, but provides no aid in longitudinal positioning. The use of two non-parallel mirrors allows the photographic subject to properly align itself longitudinally, and therefore in all three axes.

FIGS. 46-48 illustrate how the left and right eyes of a photographic subject see the opposite eye reflected in a single mirror when the photographic subject is properly aligned both vertically and laterally. As shown in FIGS. 46 and 47, in this position, reflected angle r is equal to incident angle i while the center line CL of mirror MIR intersects the midpoint of the interocular IO spacing between the eyes. FIG. 48 illustrates the combination of FIGS. 46 and 47 as they are superimposed over each other while FIG. 48A shows the perception of such superimposed images as seen by the photographic subject. FIGS. 50 and 50A-C further illustrate what is shown in FIGS. 46.48 from another perspective.

FIGS. 49A-D illustrate how a single mirror will allow the photographic subject to become properly aligned both vertically and laterally but does not provide any help in longitudinal alignment because photographic subject PS in FIGS. 49B and 49C see identical images in mirror MIR regardless of their longitudinal distance to the mirror.

FIGS. 51 and 51A-C illustrate the use of two mirrors to properly align the photographic subject vertically and laterally for each mirror simultaneously which only occurs when the photographic subject is properly aligned at the point where the centerlines of both mirrors intersect. If the photographic subject is not properly aligned at the intersection of the centerlines of the two mirrors, there will be a misalignment longitudinally, resulting in a visible misalignment as shown in FIGS. 52A and C.

Popix3D™ Picture Display.

A portable computing device can come preloaded with a Popix3D™ display app or the app can be downloaded from a network or retrieved from a computer readable medium. The Popix3D™ display app, in an especially preferred embodiment, allows a user to download Popix3D™ pictures and to exchange such pictures with others over a network. The app might also automate the retrieving and formatting of camera photos from a security-system DVR in from a 3-D photo booth and contain a QR Reader to link a user to a Popix3D™ picture linked to a QR Code. The app receives input from a motion sensor of the portable computing device and then uses that input to detect motion of the portable computing device and display the appropriate image from the image file associated with the movement input from the motion sensor on the screen of the so that a displayed image shown on the screen changes in correspondence with the screen angle to give an illusion of viewing a photographic subject as a solid 3-D object on the screen.

Stereoscopic 3-D Version of Popix3D™.

Stereoscopic 3-D is very popular in many formats (movies, home TV, consumer film and digital pocket cameras, camcorders, digital picture frames, magazines, postcards, etc.) and stereoscopic cell phones that are on the market including the LG Optimus 3D™, LG Thrill 4D, HTC Evo 3D, and the Sharp Aquos 3D.

The image file, IF, of this invention is forward compatible for stereoscopic 3-D portable computing devices by displaying multiple frames, one each for the right and left eyes.

Figure 41:
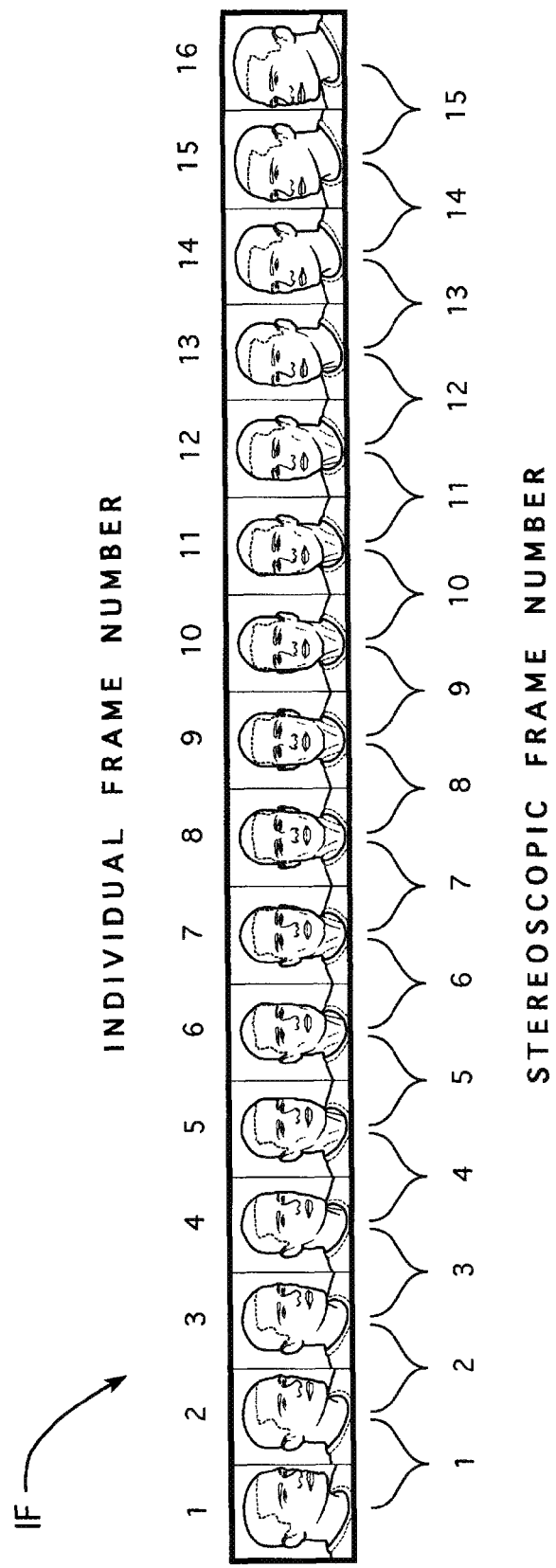
FIG. 41 illustrates an image file in accordance with the present invention with sixteen individual images and fifteen stereoscopic pairs.

There are various stereoscopic display techniques. Some techniques, lenticular and raster barrier, display left and right images simultaneously. There are also field-sequential techniques which rapidly alternate left and right frames and optically direct the left and right images to the appropriate eyes. The image file, IF, of this invention is compatible with any of these stereoscopic 3-D display techniques. Typically, adjacent images in the image file would be displayed, and the 4° angular separation chosen between the cameras of this system provides startling stereoscopic depth. The stereoscopic effect can be seen by a reader of this disclosure by viewing adjacent images in FIG. 41. In addition, because of the wealth of information in the 16 images, 15 stereoscopic pairs are displayed with motion parallax.

Figure 42:
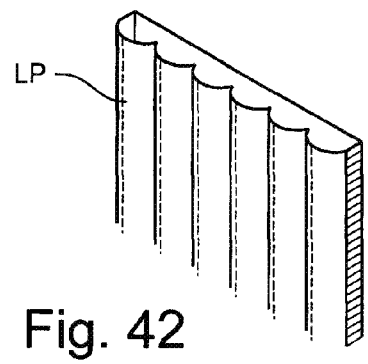
FIG. 42 illustrates a lenticular 3-D photo material which is then shown in use with a lenticular 3-D photo that is rotated between FIGS. 43 and 44 to change the visible image.
Figure 43:
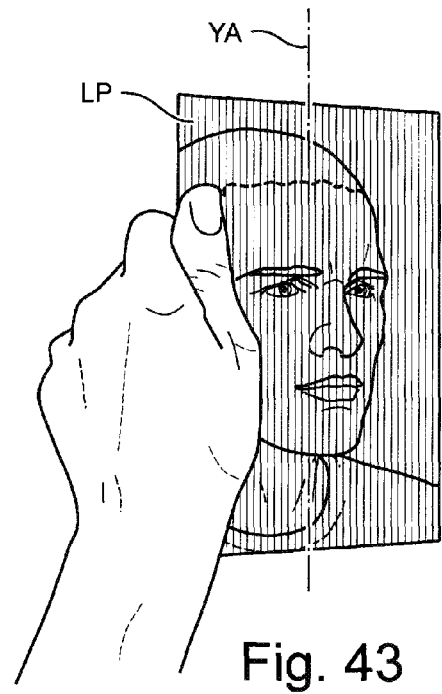
Figure 44:
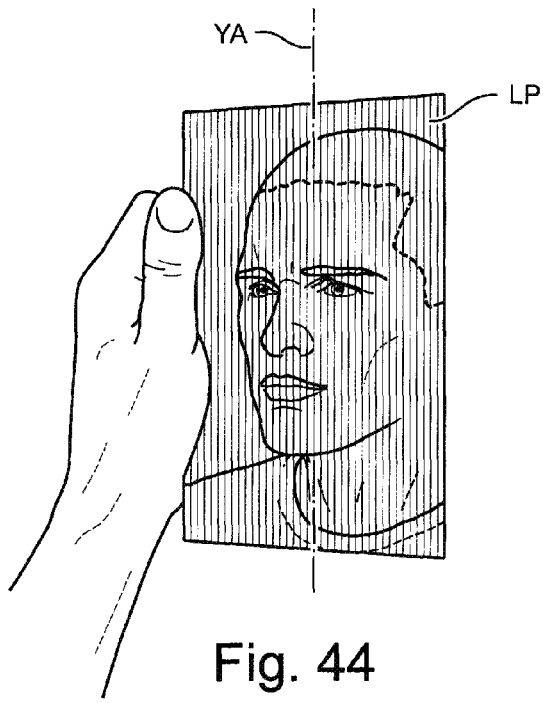
Figure 45:
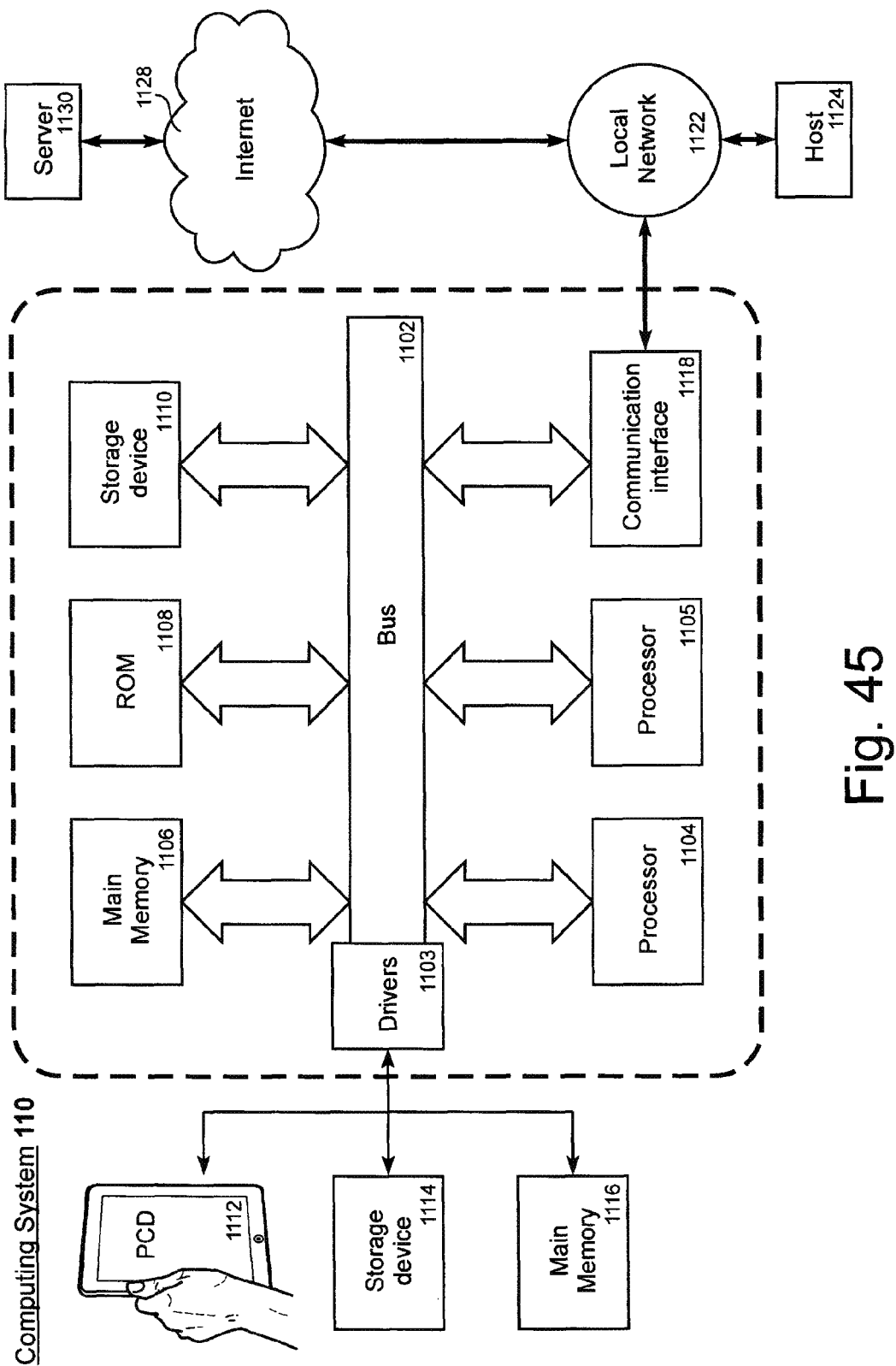
FIG. 45 is a simplified block schematic illustrating a processing system useful in certain embodiments of the invention.
Figure 50:
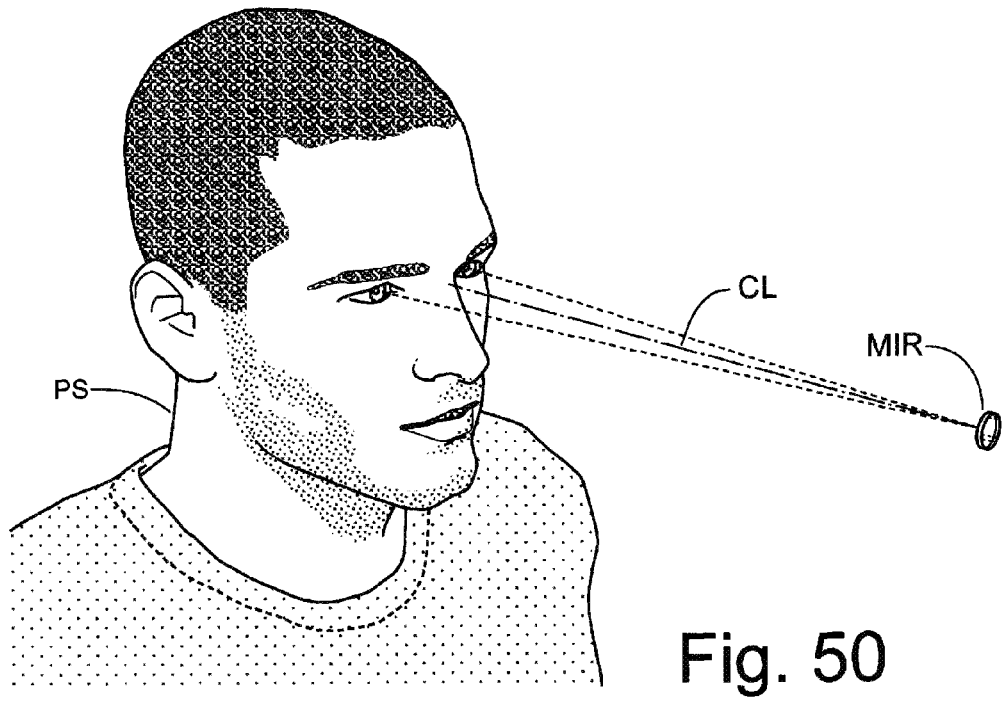
FIGS. 50 and 50A-C further illustrate what is shown in FIGS. 46-48 from another perspective.
Figure 50A:
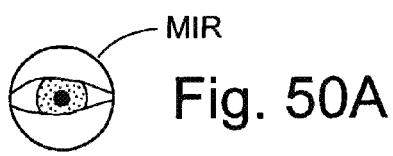
Figure 50B:
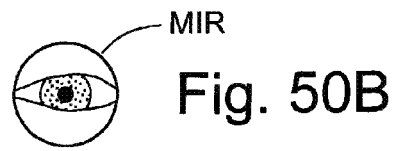
Figure 50C:
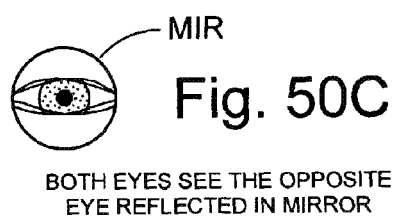

There is more than enough information in these 15 stereo pairs to print lenticular pictures which can be offered commercially to users of the photo booths. Most lenticular 3-D postcards provide only stereoscopic images from two cameras. Better versions may contain 4 or even 7 images. The 16 cameras in the Popix3D™ photo booth provide enormously more information than any other lenticular photos on the market. A lenticular photo LP (see FIGS. 43, 44) printed from Popix3D image files IF on lenticular print material (see FIG. 42) provides the same look in an inexpensive, pocketable and mailable version as the image file shown on the display screen of the portable display.

The photo booth can also record two adjacent images on an SD or other memory card which can be used to display a 3-D image full screen on a home 3DTV.

The Processing System.

As already noted, the present invention is not meant to be limited to any particular portable computing device, and is potentially useful in any device with a computing system that contains a display screen whose rotation can be sensed.

A computing system 110 suitable for use in the present invention typically comprises memory 1106, 1116 that may include one or more of random access memory ("RAM"), static memory, cache, flash memory and any other suitable type of storage device that can be coupled to a bus 1102 or other communication mechanism. In some embodiments, memory 1106 and one or more processors 1104, 1105 may be fabricated in a common device and/or collocated in a common package. Memory 1106, 1116 can be used for storing instructions and data that can cause one or more of processors 1104 and/or 1105 to perform a desired process. Main memory 1106 may be used for storing transient and/or temporary data such as variables and intermediate information generated and/or used during execution of the instructions by processor. Some computing systems 110 may comprise one or more separate non-volatile storage device 1114, such as read only memory ("ROM"), flash memory, memory cards or the like; non-volatile storage 1114 may be connected to the bus 1102 or other communication mechanism, but may equally be connected using a high-speed universal serial bus (USB), Firewire or other such bus that is coupled to the bus 1102 or other communication mechanism. Non-volatile storage 1108 can be used for storing configuration, and other information, including instructions executed by processors 1104 and/or 1105. Non-volatile storage may also include a mass storage device 1110, such as a magnetic disk, optical disk, and/or flash disk that may be directly or indirectly, temporarily or semi-permanently coupled to the bus 1102 or other communication mechanism and used for storing instructions to be executed by processors 1104 and/or 1105, as well as other information.

Computing system 110 may provide an output for a display system 1112, typically in a control panel. In some embodiments, display system may comprise one or more of an LCD flat panel display, a touch panel display, electroluminescent display, plasma display or other display device that can be configured and adapted to receive and display information to a user of the computing system. Typically, device drivers 1103 can include a display driver, graphics adapter and/or other modules that maintain a digital representation of a display and convert the digital representation to a signal for driving a display system 1112. The computing system 110 may also include logic and software to generate a display signal provided to a remote terminal or different computing system. An input device can be provided locally or through a remote system. It will be appreciated that input and output can be provided from and to a wireless device such as a smart cell phone, a PDA, a tablet computer or other system suitable equipped to display the images and provide user input.

Certain embodiments of the invention are especially suited for use with a smart phone such as the iPhone™. In such embodiments, for example, instructions may be stored in main memory 1106, having been received from a download made over the Internet, whereas computers might receive such instructions from a computer-readable medium such as a storage device 1114. Execution of the sequences of instructions contained in the main memory 1106 causes one or more processors 1104 and/or 1105 to perform process steps according to certain aspects of the invention. In certain embodiments, functionality may be provided by embedded computing systems that perform specific functions wherein the embedded systems employ a customized combination of hardware and software to perform a set of predefined tasks. Thus, embodiments of the invention are not limited to any specific combination of hardware circuitry and software.

The term "computer-readable medium" is used to define any medium that can store and provide instructions and other data to a processor, particularly where the instructions are to be executed by a processor and/or other peripheral of the processing system. Such medium can include non-volatile storage, volatile storage and transmission media. Non-volatile storage may be embodied on media such as optical or magnetic disks, including DVD, CD-ROM and BluRay. Storage may be provided locally and in physical proximity to a processor or remotely, typically by use of network connection. Non-volatile storage may be removable from computing system, as in the example of BluRay, DVD or CD storage or memory cards or sticks that can be easily connected or disconnected from a computer using a standard interface, including USB, etc. Thus, computer-readable media can include floppy disks, flexible disks, hard disks, magnetic tape, any other magnetic medium, CD-ROMs, DVDs, BluRay, any other optical medium, punch cards, paper tape, any other physical medium with patterns of holes, RAM, PROM, EPROM, FLASH/EEPROM, any other memory chip or cartridge, or any other medium from which a computer can read.

Transmission media can be used to connect elements of the processing system and/or components of a computing system. Such media can include twisted pair wiring, coaxial cables, copper wire and fiber optics. Transmission media can also include wireless media such as radio, acoustic and light waves. In particular radio frequency (RE), fiber optic and infrared (IR) data communications may be used.

Various forms of computer readable media may participate in providing instructions and data for execution by a processor. For example, the instructions may initially be retrieved from a magnetic disk of a remote computer and transmitted over a network or modem to a computing system. The instructions may optionally be stored in a different storage or a different part of storage prior to or during execution.

A computing system may include a communication interface 1118 that provides two-way data communication over a network that can include a local network 1122, a wide area network or some combination of the two. For example, an integrated services digital network (ISDN) may used in combination with a local area network (LAN). In another example, a LAN may include a wireless link. A network link typically provides data communication through one or more networks to other data devices. For example, a network link may provide a connection through a local network to a host computer 1124 or to a wide area network such as the Internet 1128. A local network and the Internet may both use electrical, electromagnetic or optical signals that carry digital data streams.

A computing system can use one or more networks to send messages and data, including program code and other information. In the Internet example, a server 1130 might transmit a requested code for an application program through the Internet and may receive in response a downloaded application that provides for the anatomical delineation described in the examples above. The received code may be executed by a processor.

Although the foregoing detailed description is illustrative of preferred embodiments of the present invention, it is to be understood that additional embodiments thereof will be obvious to those skilled in the art. For example, movie studios, with 3-D computer models of actors, can create a morph image, which in addition to horizontal motion-parallax 3D, can have the image change from one state to another through the extent of the image range. For example, if advertising a werewolf movie, the images would make the transition from the actor's face at the beginning, changing to the werewolf as the display is turned. A car company can advertise a ear simply using motion parallax, or showing the convertible top opening as the portable device is rotated through the angular range, closed top on one side to open top on the other. Also, while the foregoing description has referred to an image file that contains multiple images, rather than using an image file that is a single format file, the image file could be made up of multiple files used and accessed independently, as long as the speed of doing so would not result in delay sufficient to negatively impact the visual appearance sought to be achieved by the present invention, and such storage would be the equivalent of a single format image file as presently envisioned. In such a scenario, the multiple files, whether they be stored in a single database, multiple databases or multiple forms of computer readable media, would all function as an image file as described and used in the foregoing description, and thus fall within the definition of such an image file, although such usages would be slower and less elegant than the single format image file described above, at least in terms of technology presently available. Further modifications are also possible in alternative embodiments without departing from the inventive concept.

An example of a further modification of the present invention is to adapt the concepts already described to an application ("app") for a mobile phone, a tablet computing device, or the like. While such an app can be adapted for use in Apple® products, it can also be adapted for use in Android devices, or for other platforms, including platforms that may be developed in the future. However, for purposes of explanation only, the following description will make reference to Apple® products.

The Apple® iPhone®, such as the iPhone 4 or iPhone 5, can be loaded with an app that can be used to capture, transfer and display Popix3D™ pictures in accordance with the present disclosure.

In terms of acquiring images for creating a Popix3D™ picture, an iPhone can be used, in a video camera mode, to capture a video recording generated either by rotational movement of the photographic subject, (e.g., turning in place, movement of a turntable on which the photographic subject is placed or a person on a swivel chair while the iPhone is stationary) or by moving the iPhone while the photographic subject remains stationary. For ease of use, it is especially preferred that the video recording begun with the photographic subject turning beyond the final angle of rotation in one direction from a center point and that it continue to as a continuous recording through rotation in the other direction from the middle of the video.

Figure 54:
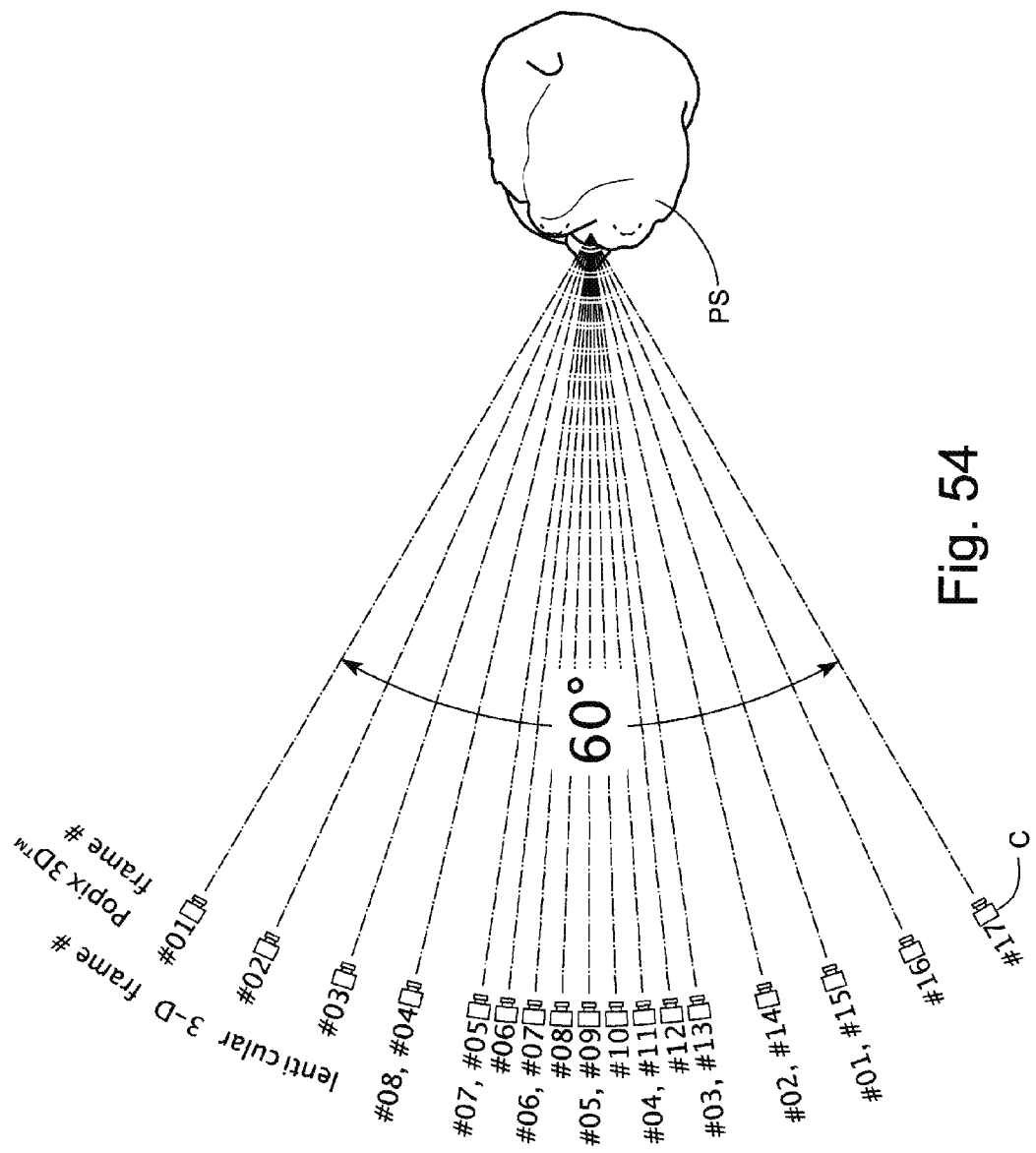

Once a video recording has been made that includes rotation in the correct direction around a vertical axis, the app's editing tool can be used to save a desired range of rotation, such as a central ±30 degree range. After the video recording has been edited to save its desired rotation range, the app generates a Popix3D™ picture from the file. As is illustrated in FIG. 53, the app first selects a set of images (e.g., 17) from the video file to accommodate the desired number of images at the desired rotational spacing needed to generate the Popix3D™ picture. Thus, for example, assume that generation of a Popix3D™ picture will require an image from the locations illustrated in FIG. 54, and set forth in the table of FIG. 55. The app will choose the images from the video file that best meet the chosen locations; if a frame is not exactly at the desired degree of rotation, the closest image will be chosen. Once the group of images is selected from the video recording, the app can crop the images to a desired ratio (e.g., a 3:2 ratio), and resize each image. During the cropping process, the app locates the eyes of the photographic subject which are used as a centering reference. The eyes will be centered laterally, and at a desired proportional frame height above the bottom of the frame (e.g., 60%). The crop width, ideally, should be as large as possible without going outside the original video area for any of the frames being processed. Each of the images to be cropped should be evaluated to find the frame with the minimum distance from the center of the eyes to the edge of the crop template, and this will determine the pixel size of the crop template which can then be applied to each frame. Note that it is not necessary that the photographic subject must appear at precisely the same place in each video frame. As is illustrated in FIG. 53, variations in location are adjusted for by use of the cropping procedure, in effect providing a shake-compensation function. The app makes no provision or correction for tilt of the head or the camera.

Figures 55, 56:
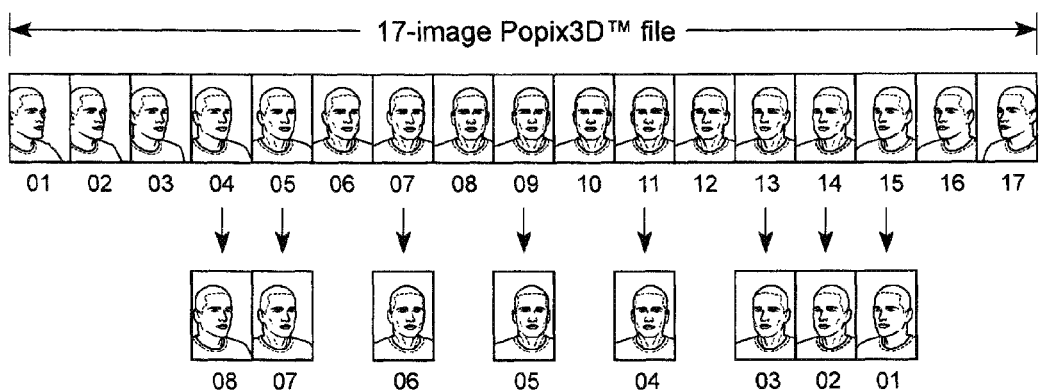
Figure 58:
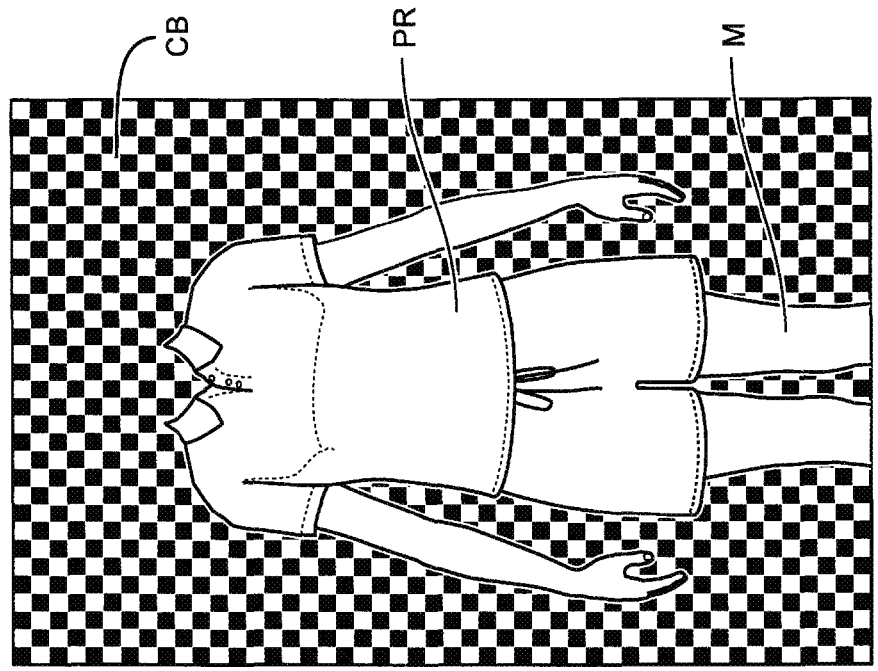

After all of the chosen frames from the video file have been cropped and resized, the resized images will be used to generate a Popix3D™ picture file, as is illustrated in FIG. 56. Note that the images generated by the app can be used to make a lenticular 3-D print. Because such a file may not require all of the images, the app can select a subset of images to be sent to a party making the lenticular 3-D print as is also illustrated in FIG. 56.

The app just described is especially useful for generating a Popix3D™ picture file of a person. However, it, or an advanced version of the app, can also be used for product marketing so that customers can "try on" products and see how they will work, even though the product and potential customer are not physically present at the same physical location. Thus, by use of a website, or a mobile application, products and customers can now be brought together in a powerful new fashion.

Figure 57:
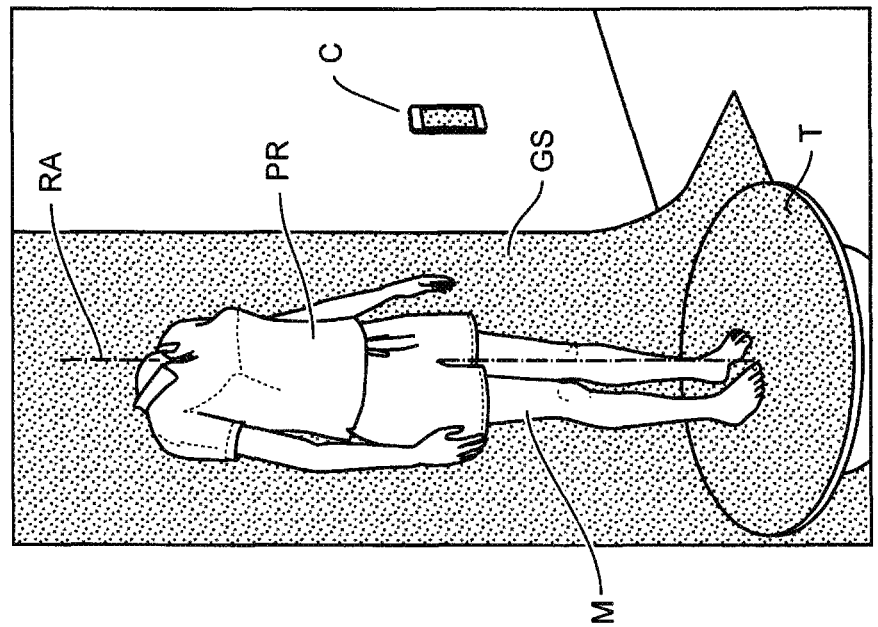
Figure 59:
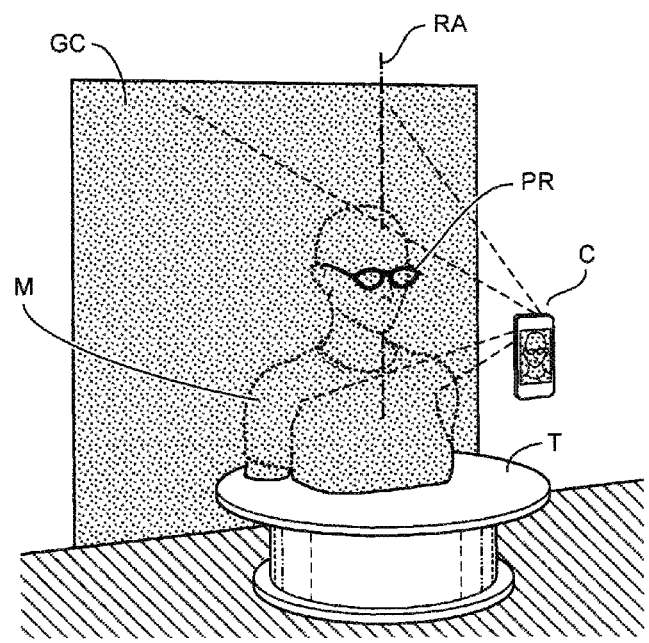
Figures 60, 61, 62:
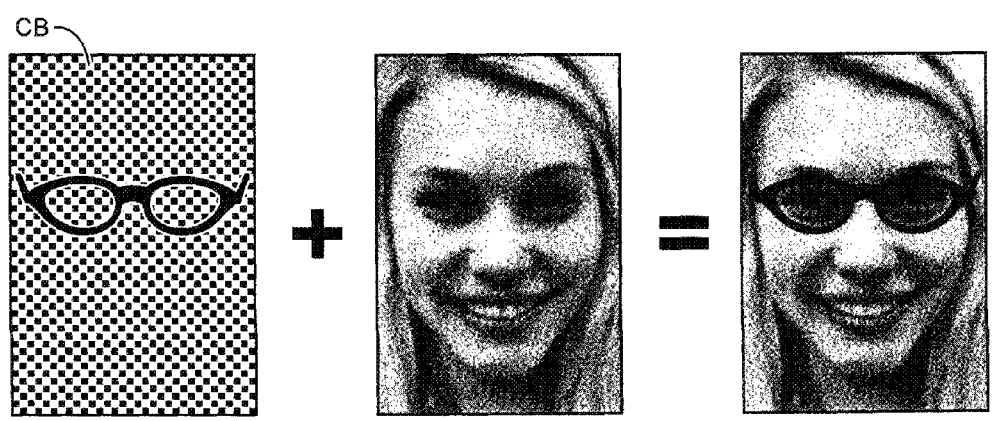
FIGS. 60-62 illustrate how such an image file can be added to an image file to create a superimposed new image file incorporating both image files.

To pursue such product placement, the same app can be used to take a video of a product, such as clothing (see FIG. 57), glasses (see FIG. 59), jewelry, hats and the like. For such items, the Popix3D™ picture file is generated in the same fashion as already described for an individual, except the product PR is placed on a mannequin and the app uses the mannequin's head (and the location of its "eyes") instead of a head of a live person for centering purposes. The resultant Popix3D™ picture file of the product will be centered and sized in exactly the same fashion as that of a Popix3D™ picture file for a live person, which allows the app to combine or merge two such files together to form a composite Popix3D™ picture file with correct proportions (e.g., two image files shown in FIGS. 60 and 61 are merged combined or merged together to end up with a single combined image file shown in FIG. 62). By establishing a common rotational axis (the midpoint between the eyes) for live people and products on mannequins, image registration is assured when the head shots are merged with clothes, eyeglasses, scarves, hats, etc., otherwise, when the portable device is rotated, the product would seem to separate from the headshot due to motion parallax.

If the product being combined with a person's Popix3D™ picture file is photographed on the head of a mannequin, like glasses, little resizing between the two files is necessary. If another product is being combined, like clothing, some additional steps will be necessary so that the size of the head file is resized to that of the body on with which it is being combined. The resizing of the head might be done manually through a process in which the face file is placed over the body and then manually resized by the user, or it may be done automatically by the app.

Because the goal of such product placement is to illustrate how product will look with a person having a Popix3D™ picture file, chroma-key photography can be used to eliminate unnecessary elements of the product picture. Thus, for example, in the case of clothes, the mannequin should be positioned on a turntable T with a chroma-key backdrop (e.g., a green screen) so that it rotates around a vertical axis between the mannequin's "eyes", so that the product will register with the user's headshot. Additional chrome-key editing by the app will allow unwanted background to be removed and made transparent in the final image. One way the app can allow chroma-key editing is to allow the user to select one or more objects in the image and then edit the object(s) out of the background. When objects have been edited out of the background, initially they are depicted in a checkerboard pattern CB (see FIG. 53) which indicates that they will not be included in what will be merged with another Popix3D™ picture file.

So far the present description of a smart phone app has focused on smart phones, such as the iPhone®, that are not stereoscopic. The app can also be adapted so that it can be used with a stereoscopic display device. As noted earlier, for such a display, a pair of images (see FIG. 41) is used simultaneously to provide stereoscopic 3-D viewing.

The functions of the app described so far have focused on taking and obtaining Popix3D™ picture files for individuals and products by use of an iPhone®. The same program can also facilitate exchange of such files through social media, such as Facebook® and the like, and the purchase of lenticular 3-D prints. While a single app can perform all such functions, it is not necessary that the app only use Popix3D™ picture files obtained by the app, as any other way of obtaining such files, as already discussed above, can also be used to create such files for use in the app in the same way as files created by the app. Thus, for example, an advertiser or merchant might want to use precise placement, a turntable and professional green screen equipment to obtain a very high quality Popix3D™ picture file for use in smart phone apps that merge such files with a user file to allow the user to see how the product will look on a user.

Accordingly, it will be readily apparent to those skilled in the art that still further changes and modifications in the actual concepts described herein can readily be made without departing from the spirit and scope of the disclosed inventions as defined by the following claims.

What is claimed is:

1. A method, comprising:
   obtaining a video recording of a photographic subject that includes rotation around a central point within a desired range of motion;
   creating a set of frames from the video recording by editing the video recording to select the set of frames within a preselected range of camera angles within the desired range of motion from the video recording;
   cropping each frame in the set of frames to generate a set of cropped frames; and
   storing the set of cropped frames in a computer-readable medium;
   wherein each frame is cropped by using a centering reference of the photographic subject and a cropping template registered to each of said frames by using the centering reference in each of said frames.

2. The method of claim 1, wherein the centering reference is an interocular distance of the photographic subject so that a vertical centerline established at a midpoint of the interocular distance is centered laterally by the cropping template.

3. The method of claim 2, wherein the photographic subject is a mannequin.

4. The method of claim 2, further comprising the steps of:
   using a sensor to measure rotation around a point of a screen of a portable computing device; and
   displaying multiple images from the computer-readable medium on the screen in response to an input from the sensor so that a displayed image shown from the computer-readable medium on the screen moves in correspondence with the screen to give an illusion of viewing a photographic subject as a solid 3-D object on the screen.

5. The method of claim 4, wherein the photographic subject in each frame of the set of cropped frames is aligned in a vertical position, a lateral position and a longitudinal position at a preselected image plane.

6. The method of claim 5, wherein the vertical centerline of each of the multiple images from the computer-readable medium is displayed at the center of the screen.

7. The method of claim 2, wherein the cropping template crops each of the set of frames to a desired ratio and resizes the image.

8. The method of claim 7, wherein the cropping template is sized by choosing substantially the largest size possible without going outside an original video area for any of the set of frames.

9. The method of claim 2, further comprising:
   selecting a set of product images of a product photographic subject;
   merging a plurality of the set of product images with a plurality of the set of cropped frames to create a set of merged images;
   using a sensor to measure rotation around a point of a screen of a portable computing device; and
   displaying multiple images from the set of merged images on the screen in response to an input from the sensor so that a displayed image shown on the screen moves in correspondence with the screen to give an illusion of viewing a photographic subject as a solid 3-D object on the screen;
   wherein the product in each of the set of product images is aligned in a vertical position, a lateral position and a longitudinal position at a preselected product image plane so that a product vertical centerline established at a midpoint of the product is centered laterally and the product is registered with the photographic image to give an illusion that each of the images of the set of merged images is an actual image of the photographic subject wearing the product.

10. The method of claim 9, wherein the set of product images is obtained by photographing the product on a mannequin.

11. The method of claim 10, wherein the product is being worn on a mannequin head of the mannequin.

12. The method of claim 10, wherein the product in each image of the set of product images is aligned by the product vertical centerline established at a second midpoint of a second interocular distance of the mannequin.

13. The method of claim 12, wherein the product and the photographic subject are registered by aligning the vertical centerline with the product vertical centerline.

14. The method of claim 11, wherein the product and the photographic subject are registered by aligning the vertical centerline with the product vertical centerline.

15. The method of claim 1, wherein the cropping template crops each of the set of frames to a desired ratio and resizes the image.

* * * * *